United States Patent [19]

Moyer et al.

[11] Patent Number: 4,719,586
[45] Date of Patent: Jan. 12, 1988

[54] MANUFACTURING PROCESS CONTROL

[75] Inventors: John A. Moyer, Fremont; Jeffery W. Duguid, Angola, both of Ind.

[73] Assignee: Moyer Process and Control Company, Inc., Angola, Ind.

[21] Appl. No.: 794,077

[22] Filed: Nov. 1, 1985

[51] Int. Cl.⁴ .................... G06F 15/20; G06G 7/48
[52] U.S. Cl. ................................ 364/552; 364/468; 364/183; 364/571; 364/900
[58] Field of Search ............. 364/200, 900, 552, 554, 364/560, 561, 571, 574, 468, 153, 154, 178, 179, 183, 469, 734, 474

[56] References Cited

U.S. PATENT DOCUMENTS

| | | | |
|---|---|---|---|
| 2,767,914 | 10/1956 | Merrill et al. | 235/61 |
| 2,897,638 | 8/1959 | Maker | 51/165 |
| 3,147,370 | 9/1964 | Lowman | 235/151 |
| 3,151,237 | 9/1964 | Hrabak | 235/151 |
| 3,515,860 | 6/1970 | Fitzgerald, Jr. | 235/151.13 |
| 3,622,448 | 11/1971 | Adams et al. | 162/198 |
| 3,648,035 | 3/1972 | Hart et al. | 235/151.1 |
| 3,666,621 | 5/1972 | Adams | 162/198 |
| 3,816,721 | 6/1974 | Turner | 235/151.13 |
| 3,875,383 | 4/1975 | Somerville et al. | 364/552 X |
| 3,876,872 | 4/1975 | Spitz | 235/151.1 |
| 3,878,982 | 4/1975 | Hoffman | 364/552 X |
| 3,881,651 | 5/1975 | Wilhelm, Jr. | 235/151.13 |
| 3,946,212 | 3/1976 | Nakao et al. | 235/151.13 |
| 4,109,511 | 8/1978 | Powers, Jr. et al. | 73/37.6 |
| 4,136,396 | 1/1979 | Hansford | 364/554 |
| 4,144,578 | 3/1979 | Mueller et al. | 364/575 |
| 4,320,463 | 3/1982 | Himmelstein | 364/552 |
| 4,433,385 | 2/1984 | De Gasperi et al. | 364/554 |
| 4,458,323 | 7/1984 | Willis et al. | 364/582 |
| 4,472,770 | 9/1984 | Li | 364/178 X |

OTHER PUBLICATIONS

Instruction Manual for Metri-Gap 300-9 High Speed Spring Gage by: Lion Precision Corp. (1976).

Primary Examiner—Errol A. Krass
Assistant Examiner—Joseph L. Dixon
Attorney, Agent, or Firm—Jeffers, Hoffman & Niewyk

[57] ABSTRACT

A process control is provided for continuously monitoring and adjusting an apparatus for manufacturing discrete workpieces. The system measures a current workpiece by taking fifteen readings and deleting the highest five and lowest five readings and averaging the center five readings. This value is then used for sorting the workpiece in accordance with preset tolerance limits. The measured average value is also compared with an expected value which the system has computed and stored. An adjustment value is then calculated based on a comparison of the measured dimension of the current workpiece and a measured dimension of the last-produced workpiece and the expected value for the current workpiece. The apparatus is then adjusted in accordance with the computed adjustment value. The system also has the ability to calculate the statistical distribution of a plurality of previously produced workpieces and to adjust the apparatus in accordance with a comparison of the dimension of the current workpiece with the three sigma limits of the distribution. Furthermore, the system has the capability of calculating a statistical distribution and printing out this data as well as performing a capability study.

19 Claims, 14 Drawing Figures

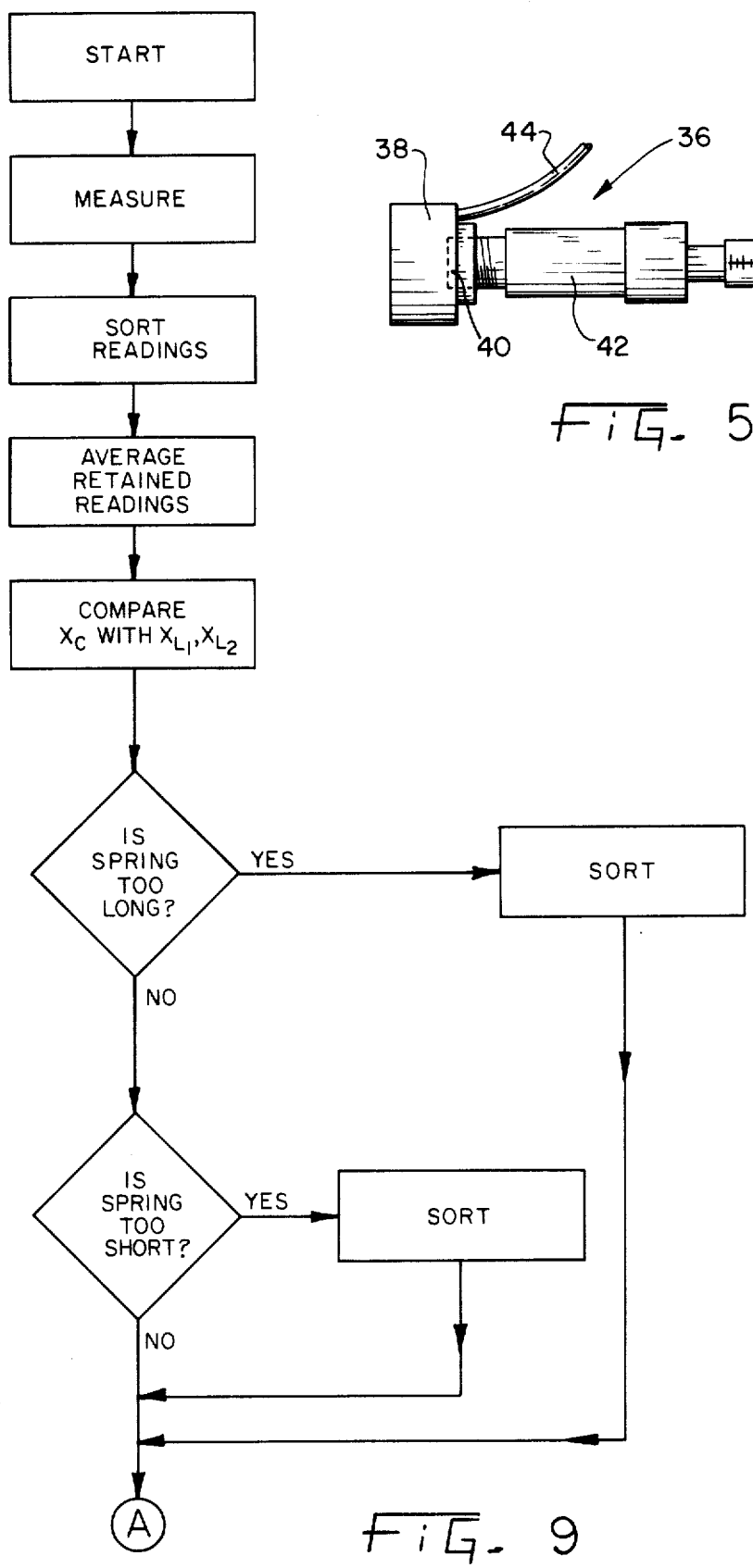

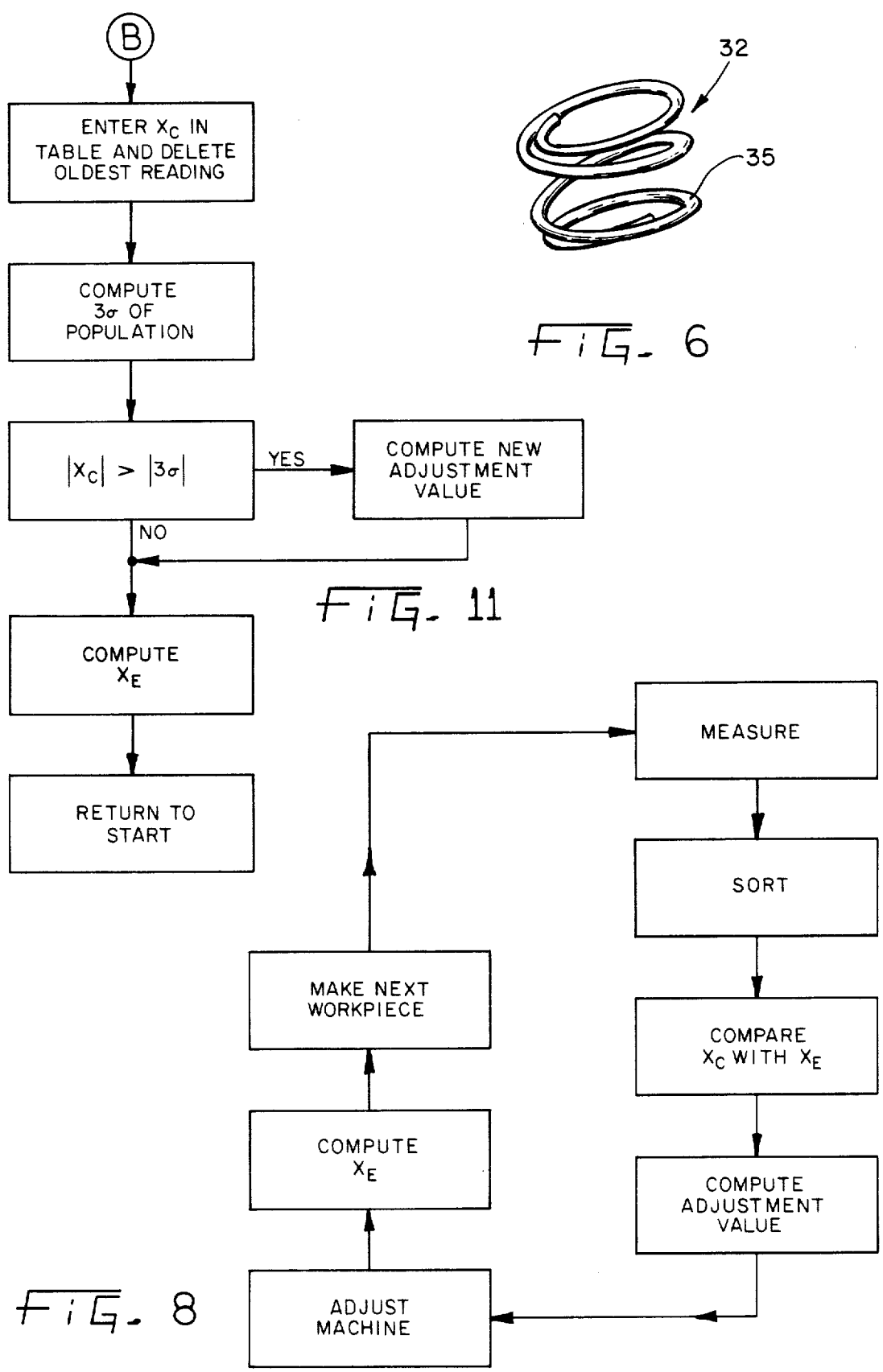

MANUFACTURING PROCESS CONTROL

BACKGROUND OF THE INVENTION

This invention relates to a manufacturing control method for manufacturing discrete workpieces. Specifically the invention relates to a method for controlling a manufacturing apparatus and process whereby one or more dimensions of manufactured discrete workpieces may be closely controlled and wherein the apparatus is continuously adjusted to produce workpieces centered about a predetermined fixed mean value. Furthermore, the invention relates to a method for performing a capability study of the manufacturing process and apparatus and for statistical analysis and print-out of the data relating to the controlled dimension of manufactured workpieces.

In most manufacturing processes constant adjustment of the process is necessary due to variations in the material used, changes in ambient temperature, tooling wear and the like. Such variations and changes give rise to variations in the dimensions of the workpieces being produced. Thus, when a dimension is critical, the manufacturing process must be controlled to keep the dimension within tolerance limits.

Conventional process control in manufacturing discrete workpieces is generally accomplished by means of a guage which measures and sorts workpieces as they are produced. Generally upper and lower tolerance limits are established for the controlled dimension and workpieces are individually measured and sorted in accordance with the established tolerance limits as the workpieces are produced. Thus, if the critical dimension is within the established limits, the workpiece is passed as a good workpiece, whereas if the workpiece is not within the established limits the workpiece is rejected as scrap. If a large number of rejected workpieces is encountered, the process may be manually readjusted to achieve a reduction in the scrap workpieces and to increase the probability of manufacturing workpieces which are within the established tolerance limits. Thus, if the established limits are relatively close together, a larger amount of scrap is generally produced. This, of course, reduces the yield of the machine and results in added expense, thereby increasing the cost of the acceptable workpieces. Thus, from a practical standpoint, conventional process control is incompatible with tight tolerance limits.

An additional problem with the conventional type of process control is that the operator will only become aware of a problem in the manufacturing process after a large number of unacceptable workpieces has been produced. Normally the only feed back the machine operator receives is by means of lights on the gauge console to indicate that workpieces are being produced which are not within the set limits and therefore are unacceptable. Thus the system is slow to respond to variations in the process to adjust the manufacturing equipment for changes in material, ambient temperatures, tool wear and the like which normally occur.

A yet further problem with conventional manufacturing systems is the inability to provide data regarding the statistical distribution of the manufactured individual workpieces. While it is generally assumed that acceptable workpieces will have a normal distribution, it is entirely possible that the distribution of acceptable workpieces is skewed, whereby a larger number of workpieces are located close to either the upper or the lower established tolerance limit. While such workpieces are acceptable because they fall within the preset tolerance limits, it has been found that in an assembly having a large number of parts, the stack-up of tolerances may cause failure of the assembly. It is therefore desired to manufacture workpieces within tight tolerances to reduce the stack up of tolerances of an assembly. However, as pointed out above, conventional processes are unable to provide tight tolerances without excessive cost.

It is therefore desired to provide a manufacturing process wherein the workpieces are centered about a fixed mean. It is furthermore, desired to provide a process which is automatically adjusted, whereby the expected dimension of each current workpiece is closer to the fixed mean than the last produced workpiece.

A number of prior art types of statistical process controls (SPC's) have been provided for controlling continuous manufacturing processes. One example of such an SPC is given in U.S. Pat. No. 3,515,960. In this process the controller maintains the controlled material property as near as practicable to a set point value and operates the process closer to or further from the proscribed limit depending upon the controllability of the process as measured by the statistical variance of the process, while continuously monitoring the process to provide assurance that the limit will not be violated in the event that the controllability of the process deteriorates either slowly or rapidly. Thus this process does not control the controlled property of the material around a centered mean and therefore is not a center seeking system. Rather this process is a boundary avoidance control system with a variable mean and wherein the mean of the distribution is varied toward or away from the boundary or limit depending upon the controllability of the process. This process is therefore intended only to avoid producing material which is outside of the lower limit and therefore only attempts to avoid the production of scrap. The process is not intended to produce material centered around a fixed mean set limit. Furthermore, the process is intended for application to a continuous process rather than to the manufacture of discrete workpieces.

U.S. Pat. No. 3,946,212, discloses a manufacturing process for producing discrete workpieces. In this process individual workpieces are measured and a statistical analysis is performed on the manufactured workpieces to determine if the process is producing workpieces within the established tolerance limits. If it is found that the process produces unacceptable parts, the operator is alerted and the process is manually adjusted. Thus this system is also not a center seeking system but is instead a boundary avoidance system. Furthermore, the system includes no automatic control for continuously automatically adjusting the machine to achieve a centered distribution. Lastly, no sorting is performed on the workpieces which are produced by the process.

U.S. Pat. No. 3,147,370 discloses a system wherein production information is automatically collected, collated and operated on so that the data may be printed out for comparison with standards without laborious manual computation. However, the system shown does not include any means for controlling the process or for automatically adjusting the manufacturing process to produce workpieces which are centered around a fixed mean.

SUMMARY OF THE INVENTION

The present invention overcomes the disadvantages of the above described prior art manufacturing processes by providing an improved manufacturing process therefor.

The manufacturing process of the present invention comprises a method for automatically controlling an apparatus for producing discrete workpieces so that the workpieces are centered around a predetermined fixed mean value. Each workpiece is measured and the measured dimension of the current workpiece is compared with the expected dimension for that workpiece. The expected dimension has been calculated on the basis of the last produced workpiece. A pitch correction or adjustment value is then determined in accordance with the comparison between the expected dimension and the measured dimension of the current workpiece and a statistical comparison of previously produced workpieces. The apparatus is then adjusted in accordance with the pitch correction value so that the next workpiece is likely to be closer to the mean. The method also comprises measuring the dimensions of a plurality of samples at discrete time intervals and performing a statistical analysis on the measured values and then printing out, on demand, the data and analysis for review by the operator. Lastly, the method includes sorting capability for sorting manufactured workpieces in accordance with established tolerance limits.

One advantage of the method according to the present invention is that production of scrap is reduced and that discrete workpieces may be manufactured within closer tolerance limits than was previously possible with prior art processes and systems.

Another advantage of the present invention is that the system reacts quickly to detected changes in the controlled dimension, whereby adjustment of the process is fast and the gauging system is adaptable to high speed manufacturing equipment.

A further advantage of the process according to the instant invention is that the pitch correction value is also based upon a statistical analysis of a plurality of previously produced workpieces whereby spurious or rogue individual workpieces will be discounted and will not adversely affect control of the process. Furthermore, the correction value is constantly modified in accordance with the last produced workpiece to improve the operation of the process.

A yet further advantage of the present invention is that ambient noise which affects the accuracy of measurement of produced workpieces will be filtered out, as the workpiece is measured numerous times and the highest and lowest measured dimensions of a produced workpiece are discarded. Therefore, if electrical machinery is operated in the vicinity of the gauging system and produces electrical noise spikes which cause spurious individual workpiece measurements, these measurements will not adversely effect control of the process.

A still further advantage of the present invention is that a hard copy printout of statistical dimensional data of currently produced workpieces is available, thereby eliminating the need for laborious manual calculations.

Yet another advantage of the process is that it permits use to tighter tolerances than was previously possible. It should be readily apparent that, by placing the tolerance limits closer together, the amount of scrap produced by conventional manufacturing processes will increase and that therefore the cost of manufacturing workpieces to close tolerances is generally prohibitive. Thus designers generally have been forced to set wide tolerance limits in order to increase the yield of manufacturing processes and to maintain the cost of workpieces at acceptable levels. This conventional restriction necessarily limits the freedom of design available to equipment designers. The present invention therefore permits designers to use closer tolerance limits without added cost.

The present invention, in one form thereof, comprises a method for controlling a process for manufacturing discrete workpieces and for automatically adjusting an apparatus for producing the workpieces about a centered mean. The process comprises the steps of first determining a mean value, selecting a system closure rate and then calculating an expected dimension for the next workpiece based on the measured controlled dimension of the last workpiece and the selected closure rate. The next workpiece is then manufactured and measured. The measured dimension of the next workpiece is then compared with the expected dimension calculated from the closure rate and the measured dimension of the last workpiece. A correction value stored in the system memory is then adjusted in accordance with the comparison. An adjustment value is then calculated proportional to the correction value. The apparatus is then adjusted in accordance with the adjustment value.

The present invention, in one form thereof, further comprises a method for controlling an apparatus for manufacturing discrete workpieces and which comprises calculating an adjustment value for adjusting the apparatus prior to manufacturing a current workpiece. The adjustment value is based on the statistical distribution of the population of a predetermined number of previously produced workpieces. An expected dimension is then calculated for the next workpiece to be manufactured. The expected dimension is based on an intended closure rate and the previous workpiece dimension value. A current workpiece is then manufactured and is measured. The dimension of the current workpiece is compared with the expected value and the correction value is modified according to the comparison. The apparatus is then adjusted in accordance with the workpiece dimension, the closure rate, and the adjustment value.

The present invention, in one form thereof, still further comprises a method for controlling an apparatus for manufacturing discrete workpieces and comprises selecting a mean value and deriving a statistical distribution of a population of produced workpieces. An adjustment value is then computed for adjusting the apparatus, the adjustment value being based on the selected mean value and the statistical distribution. A closure rate is selected for the system. An expected value for the next workpiece to be produced is then computed from the dimension of the last workpiece and the selected closure rate. A current workpiece is then manufactured and measured. The sign of the measured dimension of the current workpiece is then compared with the sign of the dimension of the previous workpiece. The correction value is updated by decrementing if the compared signs are of opposite polarity. The absolute expected value is then compared with the absolute measured value. The correction value is then updated by incrementing if the absolute measured value is greater than the absolute expected value and the expected value and workpiece dimension are of the same polarity. The apparatus is then adjusted in accordance with the updated correction value. The measured dimension of the current workpiece is then added to the list of measured values of the population and the oldest value in the population is deleted.

It is an object of the present invention to provide a automatic process control for a manufacturing process whereby the process maintains a selected dimension of discrete manufactured workpieces centered about a fixed mean.

It is another object of the present invention to provide a proportional control process wherein a machine is automatically adjusted in accordance with an internal adjustment value which is calculated from a statistical analysis of previously produced workpieces.

Yet another object of the present invention is to provide a process wherein the machine is automatically adjusted in accordance with an internal correction value which is adjusted in accordance with the measured dimension of the last produced workpiece.

A further object of the present invention to provide a control process for controlling a machine whereby production of scrap workpieces is substantially reduced.

Yet a further object of the present invention is to provide a process for controlling an apparatus for manufacturing discrete workpieces whereby the workpieces may be manufactured within close tolerance limits.

Yet another object of the present invention is to provide a process for manufacturing discrete workpieces wherein a print-out is provided including a statistical analysis of the distribution of produced workpieces.

Still another object of the present invention is to provide a process for controlling an apparatus for manufacturing discrete workpieces wherein electrical noise generated by machinery operating in the vicinity of the apparatus will not adversely effect the control process.

BRIEF DESCRIPTION OF THE DRAWINGS

The above mentioned and other features and objects of this invention, and the manner of obtaining them, will become more apparent and the invention itself will be better understood by reference to the following description of an embodiment of the invention, taken in conjunction with the accompanying drawings, wherein:

FIG. 5 is an elevational view of a gauging probe;

FIG. 6 is a perspective view of a spring;

FIG. 8 is a flow chart for the control process;

FIG. 9 is a detailed flow diagram for a portion of the control process of FIG. 8;

FIG. 11 is a flow diagram of yet another portion of the process of FIG. 8;

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Referring to FIGS. 1–6 what is shown is a coiler system for manufacturing coil springs. While the control process of the present invention is applicable to many types of machines, in the illustrated embodiment the process has been applied to a coiler. Thus the process is equally applicable to other precision machinery such as grinders and the like.

Figure 2:
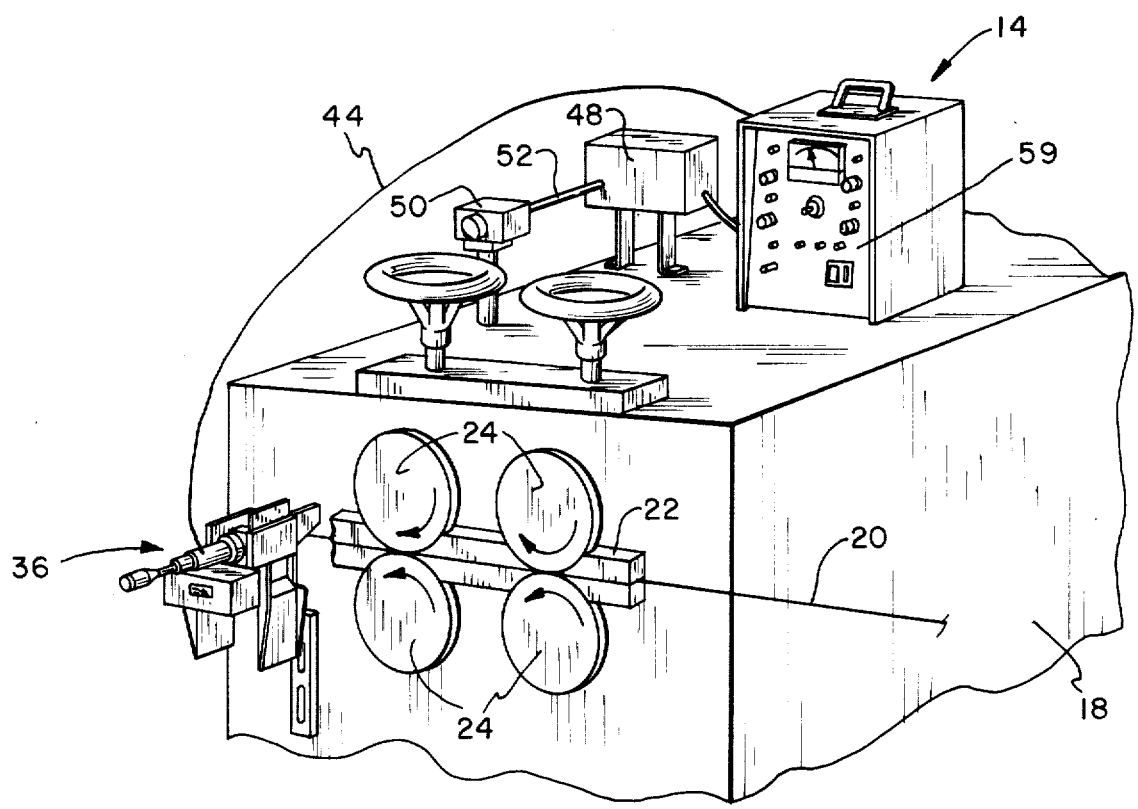
FIG. 2 is a perspective, broken away, view of a portion of the coiler of FIG. 1.
Figure 1:
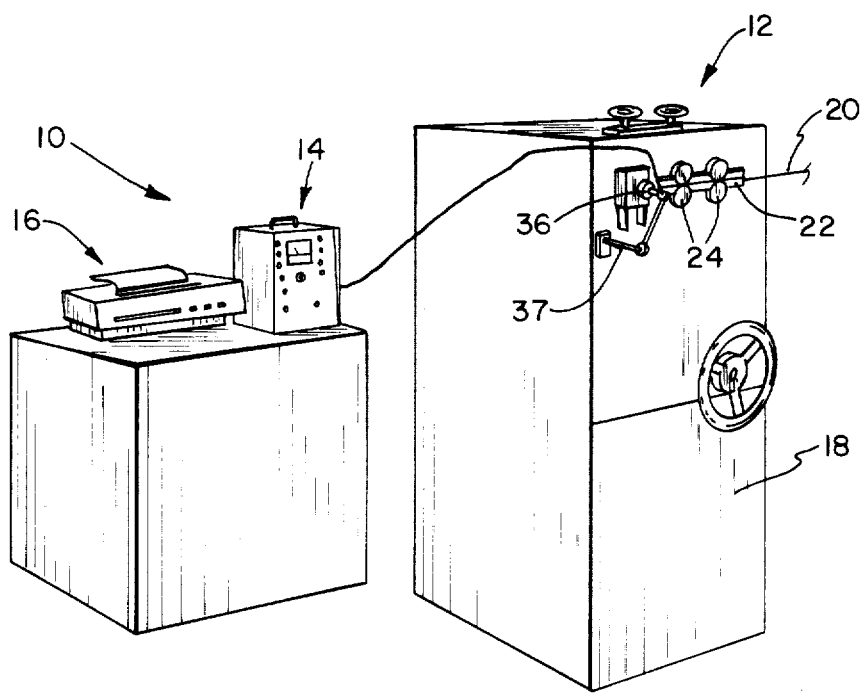
FIG. 1 is a perspective view of a coiler together with a gauge and a printer for performing the control process according to the present invention.
Figure 3:
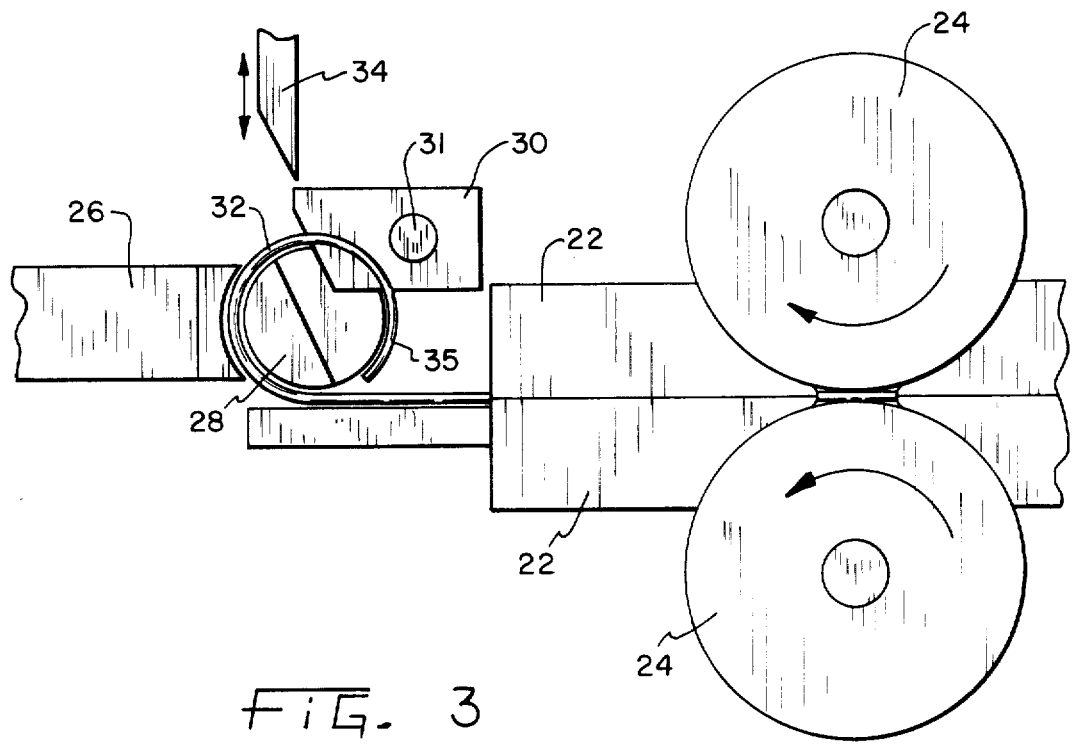
FIG. 3 is a front elevational view of the coiler feed rolls, arbor, coiling point and cut-off tool.
Figure 4:
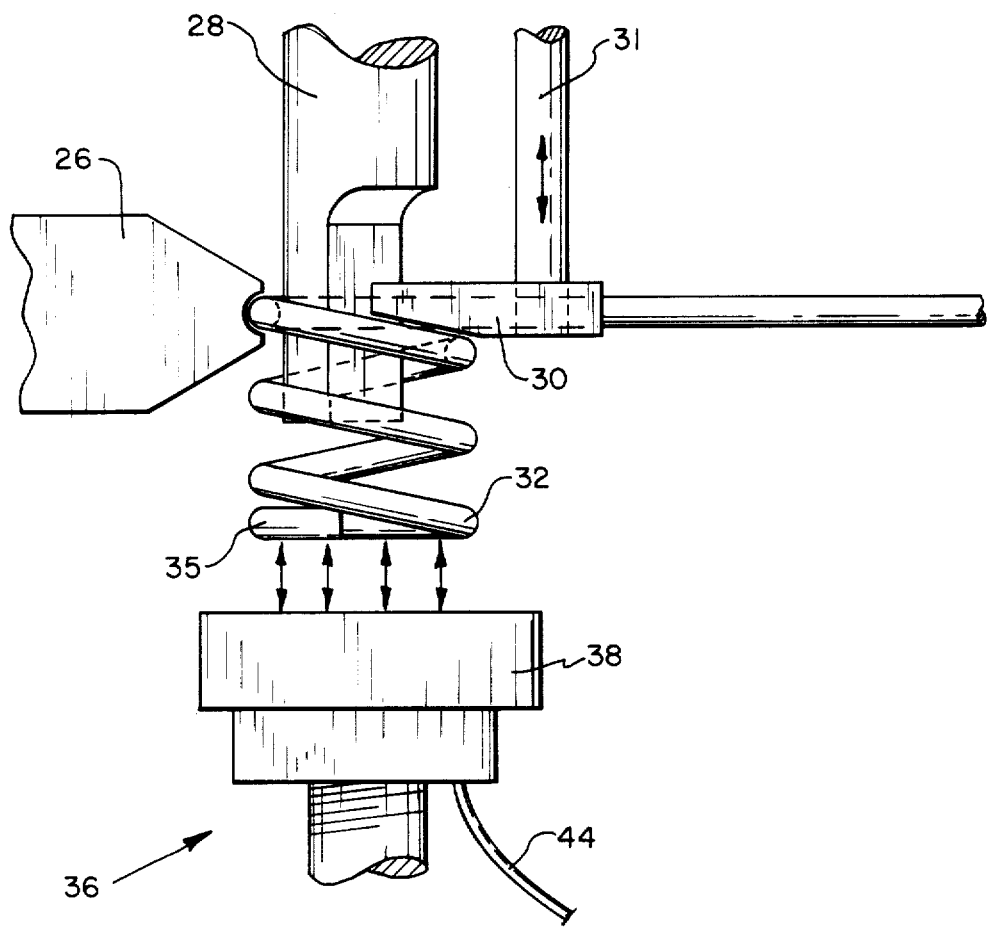
FIG. 4 is a plan view of a portion of the coiler showing the coiling point, arbor, gauging probe tip and partially wound coil.

Referring to FIG. 1 what is disclosed is a coiler system 10 including a coiler 12, a gauge 14, and a printer 16. The coiler 12 includes a cabinet 18 for housing the electric motor, driving gears, cams and the like for operating coiler 12. As best seen by reference to FIGS. 2–4 coiler 12 includes two guide blocks 22 which are conventionally manufactured from carbide steel. Wire 20, which is supplied from a spool (not shown) or other suitable source of supply, is guided by guide blocks 22 and is advanced by means of a pair of feed rolls 24, four of which are shown operating in pairs as best seen in FIG. 2. Referring to FIGS. 3 and 4, feed rolls 24 advance wire 20 toward a coil point 26 having a hollow concave point portion for engaging with wire 20 and causing wire 20 to curl upwardly and be coiled around an arbor 28. Located adjacent arbor 28 is a pitch tool 30 secured to a reciprocable shaft 31 which is reciprocably controlled by means of a cam (not shown) located inside cabinet 18. Pitch tool 30 is preferably made of carbide steel and is contour ground for the particular spring 32 to be produced. Thus, by reference to FIGS. 3, 4 and 6 it can be seen that the first coil turn of spring 32 is wound flat and that subsequent coil turns will be separated by a fixed distance commonly referred to as the "pitch". The last coil turn to be produced is again formed flat. Thus, throughout the manufacturing process of spring 32, the pitch tool will be reciprocably adjusted by means of shaft 31 and the cam arrangement to give the proper contour to the individual coil turns of spring 32. When the final coil turn has been wound, coil 32 is measured and the cut-off tool 34 will sever wire 20 by moving downwardly and pinching wire 20 against arbor 28. Coil 32 is then ejected from the coiler. The above described process is conventional and comprises no part of the present invention.

Referring now to FIGS. 1, 3, 4 and 5, a measuring probe 36 is shown located adjacent the first coil turn 35 of spring 32 as the coil is being produced. Probe 36 is secured to cabinet 18 by means of a bracket 37. Probe 36 includes a probe tip 38 for protecting a sensor 40 which is secured to a housing 42. Probe 36 also includes a conductor cable 44 for transmitting electrical signals to gauge 14 and furthermore includes a micrometer portion 46. Probe 36 is a capacitance type of probe whereby probe 36 need not touch the end 35 of spring 32 but is adjusted to leave a gap between end turn 35 of spring 32 and the end of the probe tip 38 so that the spring is free to be ejected from coiler 12 after the manufacture and the measurement thereof. To guard against temperature drift the probe tip may be heated whereby the probe temperature is relatively stable or may employ internal temperature drift compensation circuitry.

In the manufacture of springs, the most difficult to maintain spring dimension is the spring length. Thus, as changes in occur the manufacturing process, such as changes in the composition of the wire, the size of the wire, the hardness, ductility and tensile strength of the wire, variations will occur in the length of the spring. Furthermore as the tooling wears and as ambient temperatures vary whereby the gauging system encounters temperature drift, further variations in the spring length may occur. Thus, it has been very difficult with prior art gauging and sorting systems to maintain tight spring length tolerances in the production of springs.

In the system according to the present invention, after the current spring has been measured, the system will adjust pitch tool 30 to ensure that the next spring will be manufactured closer to the desired mean or free length if no further variations occur in the manufacturing process. However, since the process is dynamic, variations are likely to occur and therefore the system will constantly be adjusted to take into account any variations which may have occurred in the process during the manufacture of the last spring, so that the next spring to be produced may be expected to be closer to the desired predetermined free length dimension. As seen in FIG. 2, gauge 14 is connected to a control in control box 48 which in turn is connected to a gear box 50. Based upon the calculated input from gauge 14 control box 48 will alter the setting of pitch tool 30 to manufacture the next spring closer to the mean value than the previously produced spring.

Figure 12:
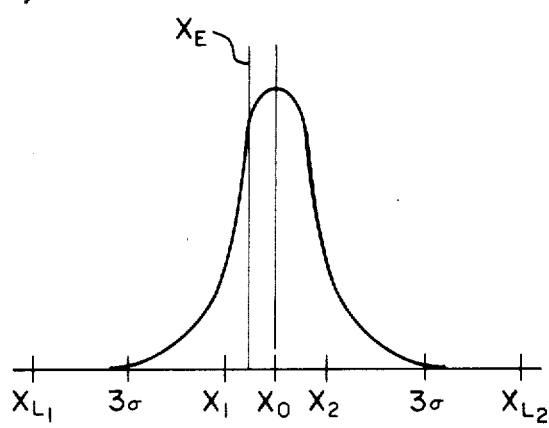
FIG. 12 is a diagrammatic representation of a normal distribution.

By referring to FIG. 12 there is shown a "normal" distribution of a population of workpieces with $X_0$ being the mean value or center value of the distribution. Thus values on opposite sides of $X_0$ will be regarded as being of opposite polarity. Lower and upper limits $XL_1$ and $XL_2$ are also shown. These limits are selected arbitrarily as the established tolerance or sort limits for the parts to be produced and are not necessarily centered on $X_0$. The $3\sigma$ points for the population are also shown. Additionally two values $X_1$ and $X_2$ are shown. In the process according to the present invention, if the current workpiece which has just been produced has a dimensional value of $X_1$, the system will, by proportional control, be adjusted so that the next workpiece to be produced will be closer to $X_0$ if no further variations in the process occur. However, if the current workpiece has a dimensional value of $X_2$, the process will be adjusted so that the next workpiece to be manufactured will be closer to $X_0$, if no further variations in the process occur. Thus the system is center seeking and will adjust to produce each workpiece closer to a preset means than the last workpiece. The process is not a boundary avoidance system wherein the process is controlled only to maintain workpieces within boundary limits $XL_1$ and $XL_2$.

It should of course be noted that by providing a center seeking system the resulting parts distribution will tend to be a normal distribution centered about a fixed mean and having closer spaced three sigma points than would be provided by conventional manufacturing processes wherein no process control is exercised other than sorting control. Thus a benefit of the process according to the present invention is the ability to hold to close tolerance limits and to specify tighter tolerance limits for discrete components than was heretofore possible. As hereinafter set forth, a capability study may be performed on the apparatus to determine the expected distribution of a population of parts to be produced by the apparatus. As further explained hereafter, the system also includes sorting capability whereby any springs having values outside of the limits $XL_1$ and $XL_2$ will be sorted out and rejected. The system furthermore includes capability for calculating the distribution of workpieces which have been manufactured by sampling and performing a statistical analysis on the measured values and by printing out the analysis by means of printer 16.

Figure 7:
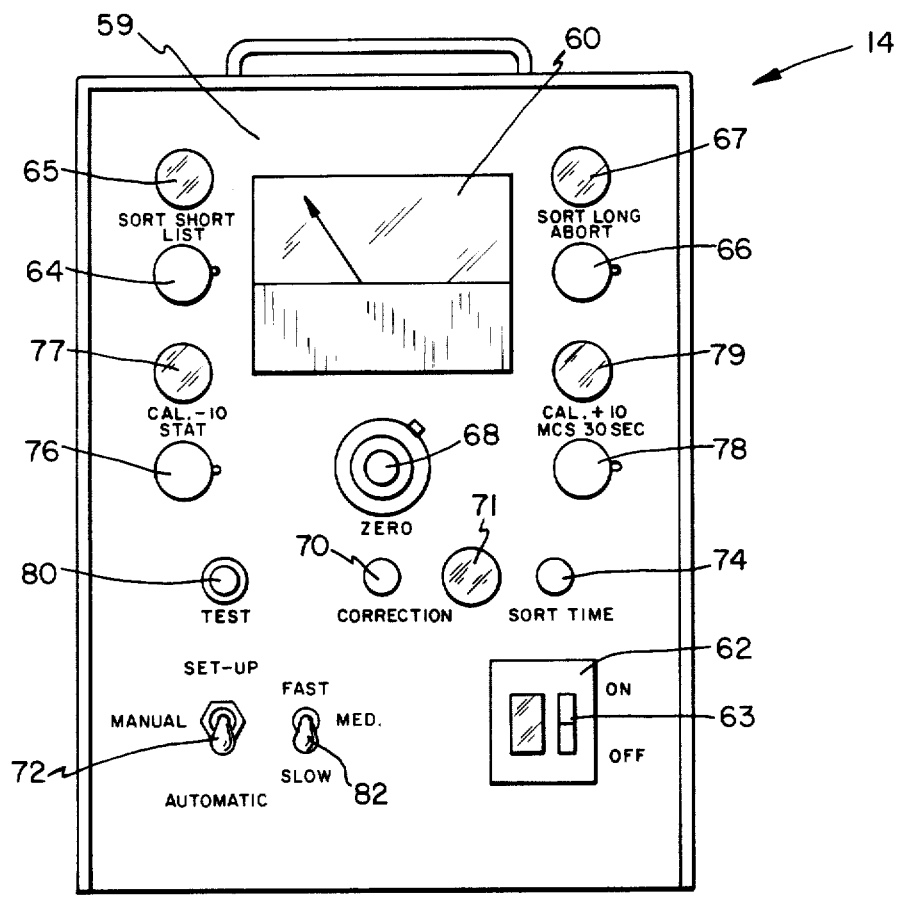
FIG. 7 is an elevational view of the gauge control panel.

Referring now to FIGS. 2 and 7 a gauge panel 59 is shown including the various operating controls located thereon. Thus panel 59 includes a meter 60, on/off switch 62 including indicator light 63, sort setting control switches 64 and 66 and sort indicator lights 65 and 67. Furthermore, the panel includes zeroing control dial 68, manual correction control 70, correction timing light 71, set up operate switch 72, sort time control 74, calibration control switches 76 and 78, a pair of inidicator lights 77 and 79, to indicate calibration control and correction output, push to test switch 80 and closure rate switch 82.

Referring now to FIG. 8, a flow diagram is shown for the control process as applied to coiler 12. The process functions as follows. Let it be assumed that the system is in the automatic operating mode. After a spring has been manufactured, the spring length is measured and referred to as the current spring length $X_C$. The spring is now sorted in accordance with the established tolerance limits $X_{L1}$ and $X_{L2}$. The $X_C$ value is then compared with the expected spring length value which has been calculated and stored in the system memory. A pitch adjustment value is then derived and the coiler is adjusted in accordance with the pitch adjustment value. A new expected value is now calculated for the next spring, after which the next spring is produced and measured. The cycle is then repeated.

Figure 10:
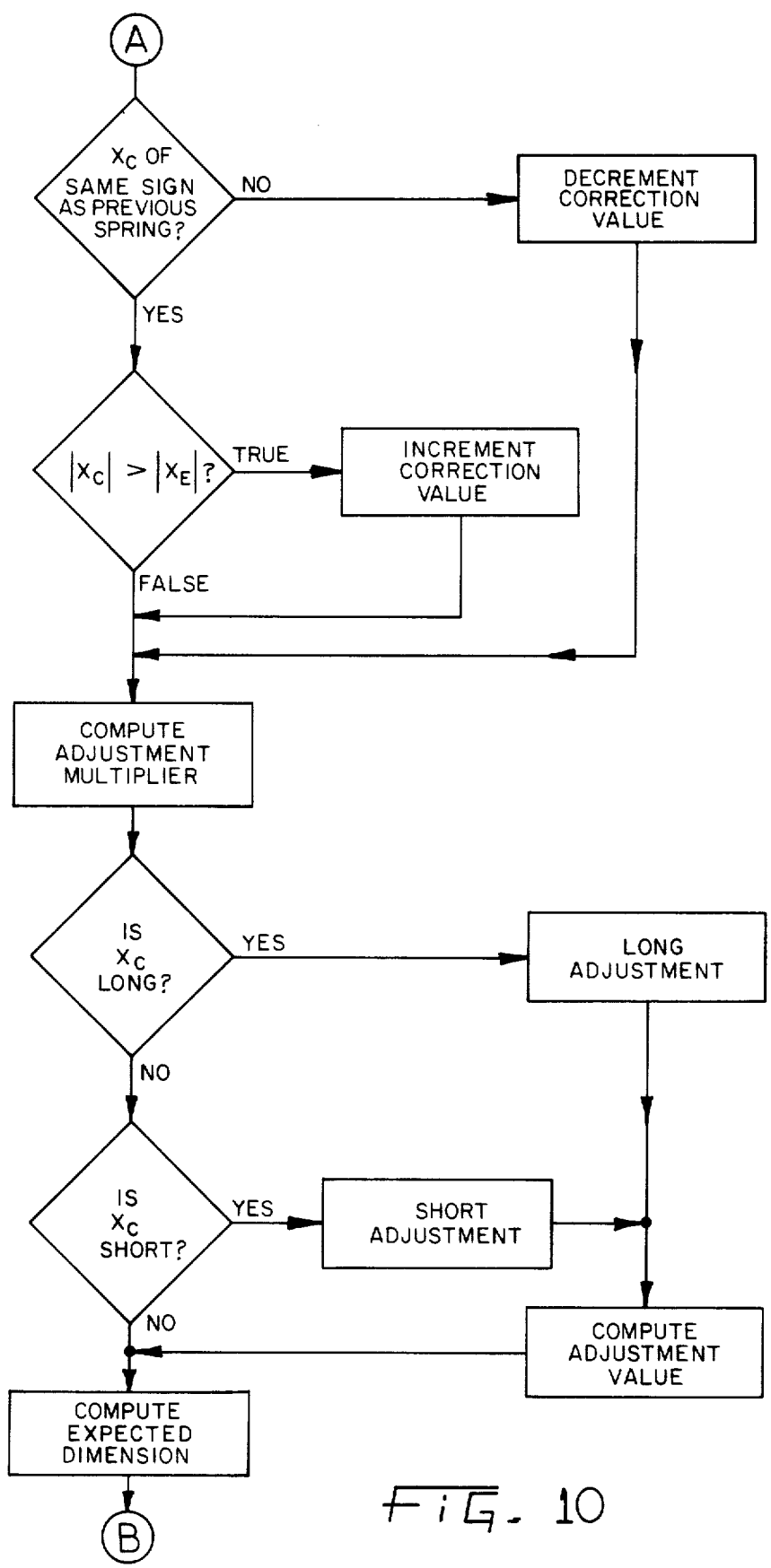
FIG. 10 is a detailed flow diagram of another portion of the process of FIG. 8.

Referring to FIGS. 9–11, a detailed flow diagram is shown for the control process of coiler 12. At the start of the process a current spring 32 will just have been manufactured and wire 20 will have ceased to feed. Switch 62 of gauge 14 will at this time be in the "on" position so that gauge 14 is in the standby mode. Let it be assumed that the gauge has already been properly set up. Switch 72 will be in the automatic setting. Closure rate switch 82 will be in one of the three indicated settings. Gauge 14 is then turned on for a predetermined period by a reed switch (not shown) which is located inside coiler 12 and which is actuated by a camming mechanism (not shown). While a reed switch is used in the preferred embodiment, any suitable type of external timing switch may be used or software may provide the proper timing. The reed switch actuates gauge probe 36 and the length of the current spring $X_C$ will be read and stored for this purpose. Probe 36 will read the current spring length a plurality of times which, in the preferred embodiment, has been selected as 15 times. The reason for taking a number of readings is to eliminate the possibility of inaccurate readings due to electrical noise. Such electrical noise may be generated by arc welders and the like and is generally random and of very short duration. This type of electrical noise generally occurs close to crossover of the 60 cycle AC line voltage. Any one of the probe readings may therefore be inaccurate and may be excessively large or excessively small due to such random electrical noise. The highest and lowest values of the plurality of readings are therefore discarded and the center readings will be retained to improve the probability of an accurate spring length measurement. Thus the next step is to sort and arrange the data from highest to lowest, to discard the five highest and five lowest readings, and to average the retained five center readings. Therefore the resulting calculated average value will be a combination of both the median and mean values of the fifteen spring length readings. By selecting the five center values we have thus eliminated the probability of adverse effect of electrical noise on the spring length measurement. By averaging the five center values we have also eliminated any randomness in the readings.

The calculated value, for the sake of illustration, will be referred to as $X_C$. This value is now compared with the established sort points $XL_1$ and $XL_2$ as shown in FIG. 12. If the spring is too long, i.e., if $X_C$ exceeds or equals $XL_2$, the sorting mechanism is actuated and the spring is rejected as being outside of the established tolerance limits. If the spring is not too long, $X_C$ is compared with the lower limit $XL_1$. If the spring length is outside of the lower tolerance limit $XL_1$ i.e. if $X_C$ is smaller than or equal to $XL_1$, the sorting mechanism is actuated and the spring is rejected. The conventional manner of sorting springs is by means of a sorting chute (not shown) by means of which the spring is deflected into a reject bin or is permitted or pass to the acceptable parts bin as determined by the sorting mechanism and based on the tolerance limits. Various other types of sorting mechanisms may also be used. Control 74 on gauge panel 59 establishes the sort time. The selected sort time should be compatible with the speed of the manufacturing process and the sorting mechanism which is used.

The system is now ready to prepare for manufacturing the next spring. Referring to FIG. 10, the stored length $X_C$ of the current spring which has just been manufactured and sorted is compared to the expected length $X_E$ for the current spring. The expected length $X_E$ for the current spring, as further explained hereinafter, was previously calculated and stored in the system memory. This expected length $X_E$ is based on the actual length of the last spring produced before the current spring and the setting of the closure rate switch 82 which determines how fast the adjustment causes the machine to approach making a spring of the mean length. Thus this setting determines the rate of closing in on the mean length.

Thus, the expected spring length $X_E$ is the expected value for the current spring based on the last adjustment of the machine and the actual length of the last produced spring. Comparison of the current spring length value $X_C$ with the expected value $X_E$ should yield a measure of the effectiveness of the last machine adjustment and the adjustment calculations stored in the system memory. The system therefore compares the sign of the current spring length $X_C$ with the sign of the last or previous spring length to see if the machine was overadjusted. If the signs of the two values are not equal, this means that the value $X_C$ and the value of the length of the previous spring are located on opposite sides of the mean value $X_0$ (see FIG. 12). The amount of machine adjustment which was made prior to manufacturing the current spring was therefore too much. Therefore, in that case, the adjustment which must be made to the system for manufacturing the next spring must be decremented. In other words the proportional system adjustment which is to be made for manufacturing the next spring is made smaller by a predetermined amount. In the instant process the adjustment is decremented by a constant amount. In the preferred embodiment, this increment is normally taken as 1. This decrementing decreases the correction value which was initially selected by the operator with control 70 in setting up the machine. Thus, the initial setting of control 70 for any value between 0 and 256 is adjusted by incrementation or decrementation to yield a "correction value" throughout the process. However, if the sign of the current spring length value $X_C$ is the same as the sign of the previous spring length value, the next question to be asked is whether the absolute value of the current spring, $X_C$, is greater than the absolute value, $X_E$, which was previously calculated and which is stored in the system memory.

If the length $X_C$ of the currently produced spring has a greater absolute value than $X_E$ the machine has not been adjusted sufficiently and therefore the stored correction value must be increased so that the system makes a greater adjustment to the coiler before manufacturing the next spring. Thus the correction value is incremented as the previous machine adjustment had been too small. On the other hand if the absolute value of the length of the current spring $X_C$ is smaller than the absolute expected spring length value $X_E$, then the value of the current spring is located between $X_E$ and $X_0$ as seen in FIG. 12, and the adjustment made to the machine before making the current spring was adequate. By reference to FIG. 12, an expected value $X_E$ is illustrated. Let it be assumed that the previous spring had a length of $X_1$. Then the expected value calculated by the system for the next spring is $X_E$, which is located somewhere between $X_1$ and $X_0$, depending upon the rate of adjustment which has been built into the system. As explained hereinafter, control 70, in the manual mode only, sets the rate of adjustment at which the system "zeros" in on $X_0$. Furthermore, fast, medium or slow closure rates may be selected by switch 82 and this is the sole determiner of the target rate of adjustment at which the system "zeros" in on $X_0$. These three settings of switch 82 are related to each other by factors of two, whereby the fast closure rate will be four times faster than the slow closure rate. In the slow speed closure rate setting the system is corrected to make up ⅛th of the required correction to reach $X_0$, assuming that no further variations in the process occur. In the medium speed adjustment setting, the system is corrected to make up ¼ of the required correction to reach $X_0$. In the fast mode ½ of the required correction is made to reach $X_0$. The setting of switch 82 is called the closure rate, as it determines the rate at which the system "closes in" the mean $X_0$.

The next step then is to calculate how much adjustment is needed for the system to produce the next spring so that the length of the next spring is closer to the means value $X_0$. An adjustment multiplier is calculated as follows:

Adjustment Multiplier = Closure Rate × Correction Value where the closure rate is the setting of switch 82, i.e., ½, ¼ or ⅛ and the correction value is the cumulatively incremented and decremented setting of potentiometer 70.

In the automatic mode the initial selected setting of potentiometer 70 has been incremented and decremented (see FIG. 10) so that the correction value is the adjusted correction value stored in the system memory. In the manual mode the correction value is the selected setting of control potentiometer 70. This adjustment multiplier value is stored and is used to adjust the pitch adjustment tool prior to manufacturing the next spring.

The next question to be asked in the process is whether the current spring is too long or too short. Some arbitrary dead band for $X_C$ may be included in the hardware. If the current spring is too long, the machine will be adjusted to make the next spring shorter. If the current spring is too short, the machine will be adjusted to make the next spring longer. The long and short adjustments are made by activating the machine adjustment mechanism for the calculated adjustment time. Furthermore, the adjustment is of such a polarity that the gear box 50 is actuated in the proper direction to manufacture the next spring longer or shorter, as needed, to derive an expected value $X_E$ closer to $X_0$.

The multiplier is multiplied with the current spring length $X_C$ to derive the amount of adjustment necessary to manufacture the next spring. The amount of adjustment is calculated as the amount of time the machine adjustment mechanism must be activated to achieve the desired amount of adjustment. The adjustment value is calculated as follows:

Pitch Adjustment Value =

$$\frac{|X_C| \times \text{Closure Rate} \times \text{Correction Value}}{255} =$$

$$|X_C| \times \text{Adjustment Multiplier}$$

The dimension of this value is time in seconds and it determines the amount of time the machine adjustment mechanism 48 and 52 are activated. The calculated adjustment time value is an absolute value.

The coiler is now ready to manufacture the next spring. However, the system still must calculate an expected value to be stored for performing calculations after the next spring is produced. This expected value is calculated as follows:

$$X_E = X_C(1 - \text{Closure Rate})$$

where the closure rate is the setting of switch 82.

After calculating $X_E$ the current spring length value $X_C$ is stored in the system memory which consists of a Random Access Memory (RAM) which is used as a shift register and which can store values for a given plurality of previously produced springs. In the specific embodiment illustrated the table includes the twenty-one values for the previously produced twenty-one springs. The value for the current spring $X_C$ is entered in the table and the oldest value in the table will be deleted. Thus in effect this table is a shift register which operates on the First In-First Out principle. The next step then is to calculate the standard deviation of the values in storage and to calculate the three sigma points of the distribution. These three sigma values are then compared with the length if the current spring or $X_C$. This comparison will determine if the current spring length is within the allowable limits of the population normal distribution. If the absolute value of the current spring length $X_C$ is greater than the maximum allowable spring length or is outside of the three sigma points, then a new adjustment time will be calculated and stored. In effect, this calculation is to avoid making an excessive adjustment from a probably non-normally distributed workpiece. Therefore, an adjustment time based on the population will be used. The procedure for calculating the new adjustment value is as follows:

Adjustment Value (New) =

$$\frac{3 \delta \times \text{Closure Rate} \times \text{Correction Value}}{255 \text{ sec.}}$$

After calculating the new adjustment value, the value is stored and substituted for the previously calculated adjustment time. The process then returns to start and is ready to measure the next manufactured spring.

What has therefore been described is a process whereby the coiler system is automatically adjusted in accordance with the previously produced workpiece or the statistical distribution of a plurality of workpieces manufactured immediately preceding the current spring. The system is center seeking so that the system always adjusts the machine to produce the next workpiece closer to the mean value. The system also includes sorting capabilities. It has been found that by having a center seeking system rather than a boundary avoidance system, the system is much more accurate and will produce a population of parts which is within much closer limits than was possible with the previously provided systems. It should be understood that the process is equally applicable to other systems and equipment for producing discrete workpieces.

In the manual mode of operation when switch 72 on gauge panel 59 has been set in the manual mode, the adjustment of the system will be done in accordance with the correction value selected by correction control 70. The system will not increment or decrement this value as is done in the automatic mode. The operator picks the correction value based upon whatever criterion he is interested in. Thus, for instance, he may use scrap as the criterion for selecting the correction value. He may also look at the least amount of adjustment entered into control 70 to keep the process centered. He may even use a very small amount of adjustment to make very small adjustments to the machine if he finds that in the automatic mode the lowest closing rate setting still gives too much adjustment. Thus, in the flow diagram shown in FIG. 10, for the manual operation of the system, the first two decision blocks following A would be bypassed and the correction value would not be incremented or decremented. Furthermore, in the manual mode, when the gauge is in the standby routine the adjustment time is periodically updated to account for any changes introduced by the operator.

The manual mode may be used, for instance, when a particularly bad batch of wire is encountered and the only consideration for the operator is to decrease scrap as much as possible. Thus, the operator may wish to introduce such a large amount of correction after manufacturing each workpiece that the next workpiece is of an opposite polarity relative to $X_0$ as compared to the last workpiece whereby scrap can be drastically reduced. Furthermore, another situation wherein manual operation of the machine may be used is when a machine capability study is desired wherein little or no correction to the system is made, thus correction control 70 is set for the lowest possible value to see how the machine would operate with, in effect, no control of the process whatsoever.

What will now be described is the set-up procedure for the system. In the set-up mode switch 72 located on the panel of gauge 14 is in the set-up position. A first spring is coiled by the machine and is determined to be an approximately good spring. The spring does not have to be exactly on the mean value $X_0$. The gauge tip 38 has been adjusted at what was considered to be a good initial position. Dial 68 is now adjusted to cause the meter 60 to read zero. All of the lights 64, 66, 77 and 79 on the gauge are now out, indicating that the gauge has been set in the zero position. This point is just the starting point for calibrating the gauge. The micrometer head 46 on the probe 36 is now turned 0.010 inch which would cause the gauge 14 to read a signal equivalent to a spring which is 0.010 inch too long. The meter 60 is now checked to see that the meter reads somewhere about the 0.010 inch mark. The calibration switch button 78 is now pressed to enter the particular setting as being 0.010 inch. Thus gauge 14 now recognizes an amount of increase in the spring length of 0.010 inch. The same procedure is now used for the short reading of minus 0.010 by using calibration switch button 76.

The next step is to enter the sort point for the springs. The probe is therefore adjusted to the selected point at which the springs are to be sorted. For instance let it be assumed that we wish to sort out all the springs which are 0.004 inch longer than the mean. At this setting of probe micrometer 46, the sort button 66 is depressed for entering this long sort point into micrometer 46. Similarly the short sort point is entered by dialing the short sort point into gauge 14 by using the short sort button 64. The probe 31 is now returned to the zero position and the set-up switch 72 is turned to the operate position. The machine is now ready to start manufacturing springs.

The operator may now measure a spring which is indicated to be on the mean or zero value to manually insure that the spring length is actually equal to the desired mean length. Gauge 14 is now ready to perform a capability study. The set up switch 72 will be in the manual mode. The coiler is turned into the operating mode and button 78 is depressed. This button has been programmed so that the gauge will take five sequential piece samples at 30 second intervals and will store the values of the samples. Gauge 14 is disabled at that point from any further changes in the control settings. Thus the gauge will take a predetermined number of readings, such as for instance five, and will print-out the data X bar and R on those samples. The machine will then wait 30 seconds and take 5 more readings and will repeat this process until 20 samples of five sequential readings each have been accumulated. At that point the machine will then calculate from the data the mean value of the data to establish control for future processing ability, and produce the necessary charts, etc. It should also be pointed out that switch 80 may be used to simulate actuation of the reed switch to speed up cycling of the machine.

Figure 13:
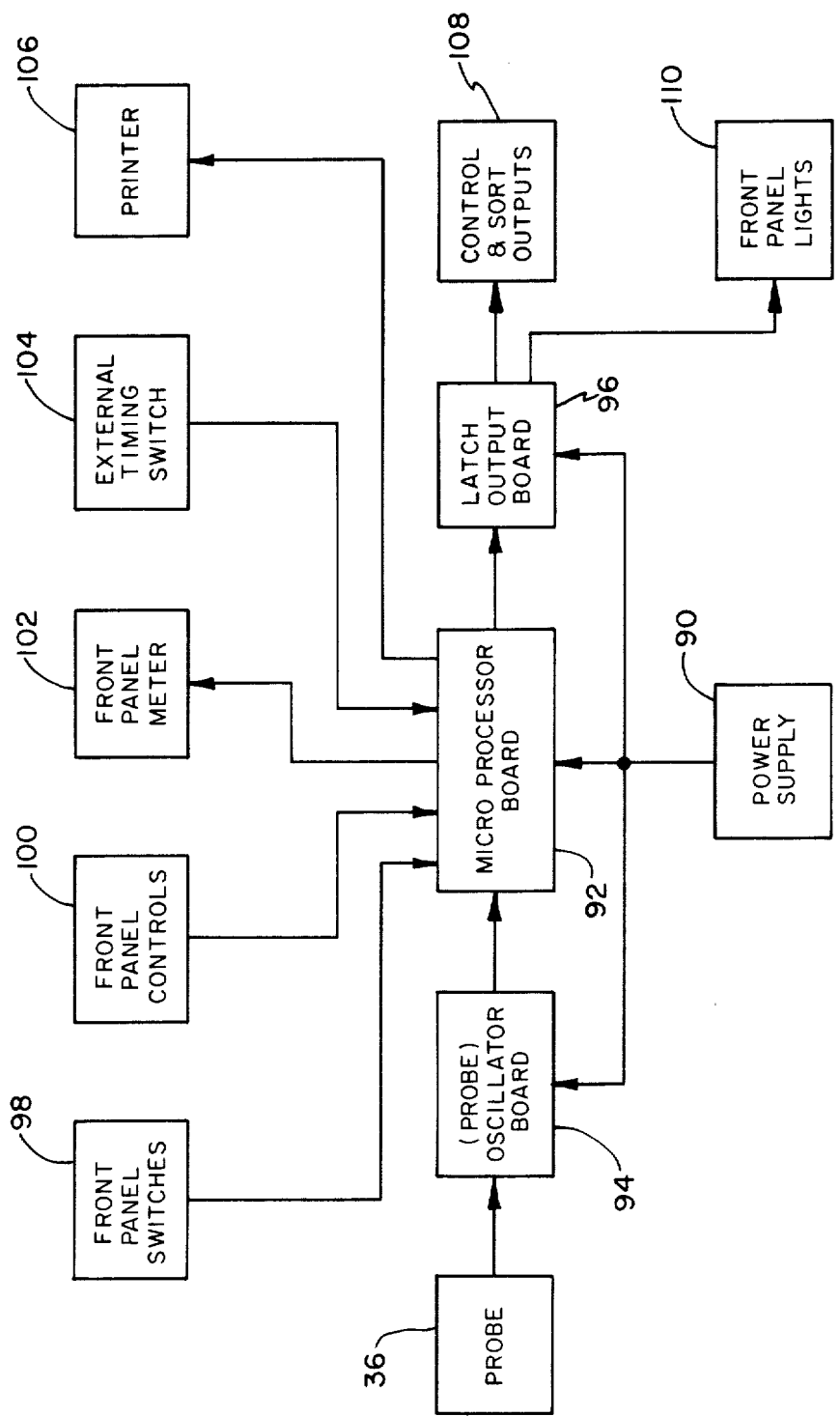
FIG. 13 is a block diagram of the electrical control circuit for controlling the process.

Referring now to FIG. 13, a block diagram for the electrical circuitry for the process control system is shown. Probe 36 functions as an input to an oscillator board 94. A power supply 90 supplies power to oscillator board 94, a microprocessor board 92 and a latch output board 96. The probe oscillator board 94 inputs an analog signal into the microprocessor board 92. The microprocessor board 92 receives inputs from the external timing switch 104, which in the preferred disclosed embodiment comprises a reed switch. Furthermore, the microprocessor receives an input from the front panel controls comprising the correction control 70, the calibration control 68 and the sort time control 74. The microprocessor board 92 also receives inputs from the front panel switches 98 comprising the sort switches 64 and 66, the setup switch 72, and the closure rate switch 82. The microprocessor board 92 supplies an output to the front panel meter 102, the printer 106, and the latch output board 96. The latch output board 96 provides outputs to the control and sort outputs 108 and the front panel lights 110. The sort outputs 108 are routed to the sorting control system for operating the sorting chute as explained hereinabove. The front panel lights 110 indicate operation of the various parts of the system as explained hereinabove.

Figure 14:
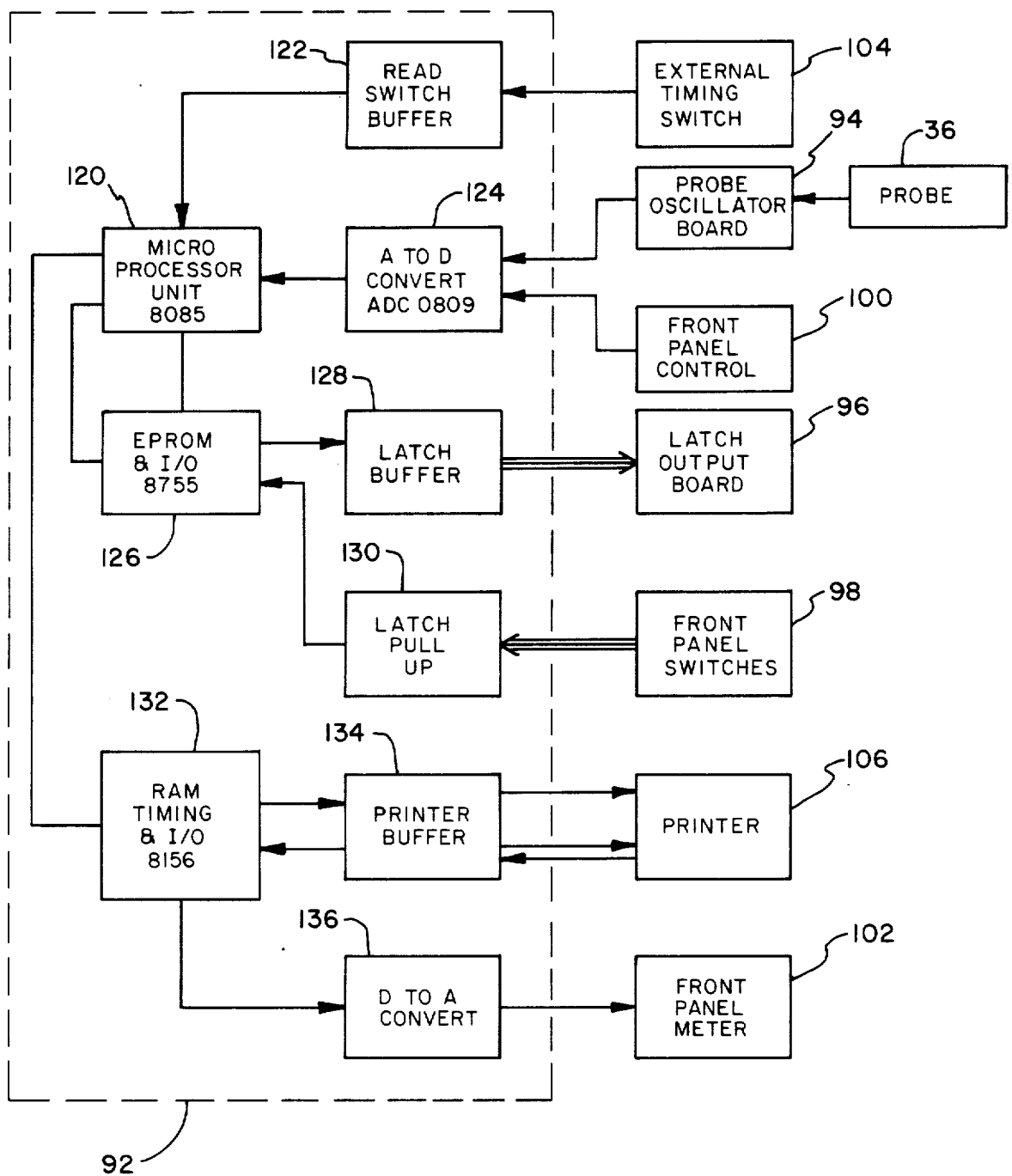
FIG. 14 is a block diagram of the microprocessor board of the electrical control circuit of FIG. 13.

Referring now to FIG. 14, a more detailed block diagram of the microprocessor board 92 is shown. The microprocessor unit is shown at 120. Microprocessor 120 comprises an 8085 integrated circuit which is commercially available. Microprocessor unit 120 communicates directly with an EPROM indicated at 126 and a RAM indicated at 132. The EPROM comprises a commercially available 8755 circuit and the RAM comprises a commercially available chip 8156 circuit. External timing switch 104 provides an input to the reed switch buffer 122 which provides a buffering interface to provide protection for microprocessor 120 and also provides a light driver for the front panel indicators. Probe 36 provides an analog input to probe oscillator board 94 which is then fed to analog to digital converter 124. Converter chip 136 comprises an ADC0809 chip and provides an input to the microprocessor unit 120. A to D converter 124 also receives an input from front panel controls 100. Latch buffer chip 128 receives an output from EPROM 126 and latch buffer 128 in turn provides eight (8) lines of output to latch output board 96. Front panel switches 98 provide eight (8) inputs to latch pull up circuit 130 which in turn provides an input to EPROM 126 on eight (8) input lines. Latch buffer 128 provides additional power for latch output board 96 and provides protection for EPROM 126. RAM 132 provides an output to D to A converter 136 which in turn supplies front panel meter 102. Printer buffer circuit 134 is connected to RAM 132 to provide an output to printer 106. Printer 106 is also connected to printer buffer 134 by means of handshake connections. There are eight (8) lines of parallel output from RAM 132 to printer buffer 134 and from printer buffer 134 to printer 106, with two of these lines being handshake lines. Circuit 134 protects RAM 132 due to possible improper connections to the printer 106. EPROM 126 contains the preprogrammed instructions for operating the control process. RAM 132 contains the temporary storage of the twenty-one (210 values of previously produced workpieces in shift register fashion as explained hereinabove as well as other variables used in the control process and the 105 piece data table read for statistical anaylsis.

The complete source program for the microprocessor circuit 92 is attached to the specification as Appendix (A) which is incorporated herein by reference from which details of the system programming will be apparent to those skilled in the art.

Also, attached to the specification is Appendix (B) which comprises a manual entitled "Do-Good Gauge".

This manual was prepared by Moyer Manufacturing Co., of Angola, Ind. and is incorporated herein by reference. The manual discloses in detail the set-up and operating procedures for the gauging system and the method disclosed in the instant application.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

APPENDIX "A"

```
EPROMTWO        ORG     4800H
TRUE            EQU     0FFFFh
FALSE           EQU     NOT TRUE
MCSHead         DB      CR$,LF$,14,ESC$,'N MACHINE CAPABILITY STUDY',15
HEADER          DB      CR$,LF$
                DB      'PART#_____ _____ MACHINE#_____'
                DB      'DATE_____ OP._____',CR$,LF$
;*****************************************************
;*      Patch Enteries                                *
;*****************************************************
Process$Delay   EQU     5               ; min
MCS$Delay       EQU     30              ; sec
METER12         EQU     false
METER25         EQU     TRUE
METER64         EQU     false
METER128        EQU     false
SIGN$CHECK      EQU     false
FIVE$WAY        EQU     TRUE
KILL$NUM        EQU     7
CoName          DB      'Moyer Spring Co. \ 1311 Wohlert \ '
                DB      'Angola Ind 46703 \ 2240-101 ',CR$,LF$
PatchEnd        DB      0
;*****************************************************
        IF      METER12
FSD     EQU     10
        ENDIF
        IF      METER25
FSD     EQU     5
        ENDIF
        IF      METER64
FSD     EQU     2
        ENDIF
        IF      METER128
FSD     EQU     1
        ENDIF
;
ORG     0000H                   ;EPROM starting address
        JMP     START
;       DB      '(C) 1985 J.DUGUID'
START   LXI     H,RamTop        ;destination
        SPHL                    ;set stack pointer to top of memory
        SUB     A               ;A=0000$0000b
START1  MVI     M,0
        DCX     H
        INR     A
        JNZ     START1          ;A=0000$0000b
        OUT     SWSC            ;set switch port to input
        OUT     LTIMER          ;clear low timer byte
        CMA                     ;A=1111$1111b
        OUT     DTOAC           ;set D to A port to output
        MVI     A,1110$1111B
        OUT     HTIMER          ;set timmer
```

```
        MVI   A,1101$0111B
                            ;start timmer
                            ;port A is output
                            ;port B is output
                            ;port C is ALT-3
        OUT   CSR           ;do it
        SUB   A             ;A=0000$0000B   turn lamps on
        OUT   Latch         ;turn controls off
        MVI   A,80H
        STA   scaleS        ;init minus scale
        STA   scaleL        ;init plus scale
        MVI   A,9
        STA   counter
        CALL  SETUP
        JMP   STANDBY
;
;*********************************
;*      READ interrupt           *
;*********************************

ORG   52            ;RST 6.5
READ    PUSH  A
        MVI   A,0000$1011B
        DB    SIM           ;Set interrupt mask for clock only
        PUSH  B
        JMP   MAIN          ;jump to the MAINLINE PROGRAM
;*********************************
;*      SYSTEM CLOCK interrupt   *
;*********************************
        ORG   60            ;RST 7.5
Clock   PUSH  PSW
        PUSH  H
        LXI   H,SortTime
        SUB   A             ;clear A
        CMP   M
        JZ    Clock0
        DCR   M
        JNZ   Clock1
Clock0  IN    Latch
        ORI   0110$0000B    ;disable sort lights
        ANI   0110$1111B    ;disable sort controls
        OUT   Latch
        SUB   A             ;clear A
Clock1  LXI   H,pitchtime
        CMP   M
        JZ    Clock2
        DCR   M
        JNZ   Clock3
Clock2  IN    Latch
        ORI   0000$0110B    ;disable adjust lights
        ANI   1111$0110B    ;disable adjust controls
        OUT   Latch
;
Clock3  LXI   H,SyClk1      ;hwd timmer to interrupt 256/sec
        DCR   M
        JNZ   Clock5        ;*** exit System Clock ***
        MVI   A,59
        LXI   H,Sec         ;update sec.
        INR   M
        CMP   M
```

```
            JP      Clock4
            MVI     M,0
            INX     H               ;update min.
            INR     M
            CMP     M
            JP      Clock4
            MVI     M,0
            MVI     A,99
            INX     H               ;update hr.
            INR     M
            CMP     M
            JP      Clock4
            MVI     M,0
Clock4      LHLD    StatClock
            PUSH    D
            LXI     D,-2
            DAD     D
            POP     D
            JNC     Clock5          ;jump if StatClock = ( 1 or 0 )
            INX     H               ; else StatClock = StatClock-1
            SHLD    StatClock
Clock5      POP     H
            POP     PSW
            EI
            RET
;
;****************************************************
;*      The STANDBY routine moniters                *
;*      the current mode of operation.              *
;*      it may transfer to the SETUP                *
;*      it may transfer to the STATOUT              *
;*      MAIN is called under interrupt control      *
;*      from STANDBY or STATOUT                     *
;****************************************************
STANDBY
;*** check the Stat switch ***
            IN      SWS
            ANI     0001$0000B      ;mask for STATS
            JNZ     SBx
SBw         IN      SWS
            ANI     0001$0000B
            JZ      SBw
            JMP     ManStatOut      ;call stat routine
;*** time for Stat printout ***
SBx         LXI     H,StatClock+1
            MVI     A,1
            CMP     M               ;flags for 1-(@StatClock+1)
            JC      SB0
            JZ      SB0
            DCX     H
            CMP     M
            JZ      AutoStatOut
;*** check the Study switch ***
SB0         IN      SWS
            ANI     0010$0000B      ;mask for STUDY
            JZ      StdyOut         ;if stat asserted low then
                                    ;call stat routine
;*** check the Abort switch ***
            IN      SWS
            ADD     A               ;abort was MSB asserted low
```

```
          JC    SB1
          LXI   H,0             ;Stat_Clock=0 means aborted
          SHLD  StatClock
SBy       IN    SWS             ;see if switch held
          ADD   A
          JC    SB1
          DCR   L
          JNZ   SBy
          DCR   H
          JNZ   SBy
          SUB   A
          STA   sample$num      ;set sample # to 0
;
SB1       IN    SWS
          ANI   0000$0100B      ;mask setup switch
          CZ    STP1            ;true if setup asserted low
;
          IN    SWS
          ANI   0000$0011B      ;mask fast & slow
          CPI   2               ;A=2 when 'slow' asserted low
                                ;A=1 when 'fast' asserted low
                                ;A=3 when nothing asserted 'med'
          MVI   A,1110$0000b
          JZ    SB3             ;must be slow
          JNC   SB2             ;must be med
          ADD   A               ;shift left
SB2       ADD   A               ;shift left
SB3       MOV   C,A
;
          IN    SWS
          ANI   0000$1000B      ;mask auto
          MOV   A,C             ;A contains "n"
          JZ    SB4             ; Z implies 'auto' mode
          INR   A               ;if manual then set bit 0
SB4       STA   mode            ;save current switches
                                ;the bit 0 = 'manual'
                                ;the bits 7,6,&5 = 'closure rate'
;
          DI
          RRC                   ;CY= bit 0
          JNC   SB5             ;jump if not manual
          OUT   POTCORR         ;latch address & start conversion
          CALL  GETSIZ
          STA   pitch           ;pOt correction pot setting in pitch
;
SB5       OUT   POTRATE
          CALL  GETSIZ
          STA   ratesp
;
          MVI   A,0000$1001B
          DB    SIM             ;unmask the Read and Clock interrupts
          EI
;
          JMP   STANDBY         ;loop back to the top
;
;*********************************************
;*     SETUP does as it says and is ran when  *
;*     the setup switch is asserted. It is    *
;*     called once in initialization as well. *
;*     It uses :                              *
```

```
;*      sortLsp adjLsp adjSsp sortSsp sortK        *
;*      corrsp scale SIZEIN POTSL POTAL POTAS      *
;*      POTSS POTRATE POTCORR LATCH SWS            *
;*      and DTOA                                   *
;*********************************************
SETUP   MVI     B,4
        LXI     D,sortSsp
        MVI     A,125
STP0    STAX    D               ;
        ADI     2               ;init setpoints
        INX     D               ;for 0 adjustment
        DCR     B               ;
        JNZ     STP0
STP1    DI                      ;**** SECOND ENTERY PT
        IN      SWS
        ANI     1000$0000B
        JNZ     STP2
        CALL    GETSIZE
        STA     sortLsp         ;store rawsize
STP2    IN      SWS
        ANI     0100$0000B
        JNZ     STP3
        CALL    GETSIZE
        STA     sortSsp
STP3    IN      SWS
        ANI     0010$0000B
        JNZ     STP6
        CALL    GETSIZE
        STA     calcLsp
STP6    IN      SWS
        ANI     0001$0000B
        JNZ     STP9
        CALL    GETSIZE
        STA     calcSsp
;
;section to turn on or off lights according
;to the current setpoints
;
STP9
        CALL    UDMETER         ;raw size in D
        MVI     B,0110$0110B    ;desable all lights
        LXI     H,sortLsp
        MOV     A,D             ;A=RAWSIZE
        CMP     M
        JC      SETUP1          ;size < setpt = true
        MOV     A,B
        ANI     1011$1111B      ;enable sort long light
        MOV     B,A
SETUP1  LXI     H,calcLsp
        MOV     A,D             ;A=RAWSIZE
        CMP     M
        JC      SETUP3          ;size < setpt = true
        MOV     A,B
        ANI     1111$1011B      ;enable adj long light
        MOV     B,A
SETUP3  LDA     calcSsp
        CMP     D               ;D=RAWSSIZE
        JC      SETUP5          ;setpt < size = true
        MOV     A,B
        ANI     1111$1101B      ;enable adj short light
```

```
        MOV     B,A
SETUP5  LDA     sortSsp
        CMP     D               ;D=RAWSIZE
        MOV     A,B
        JC      SETUP7          ;setpt < size = true
        ANI     1101$1111B      ;enable sort short light
        MOV     B,A
;
        IF      FIVE$WAY
SETUP7  LXI     H,sortSsp
        LDA     sortLsp
        MOV     E,A             ;E = sortLsp
        SUB     M
        MOV     C,A             ;C = difference
        ADD     E               ;A = sortLsp + diff
        JNC     SETUP8
        MVI     A,255
SETUP8  DCR     A
        CMP     D               ;flags = longsp - RAWSSIZE
        MOV     A,B
        JC      SETUP10         ;enable both lights
        MOV     A,M             ;A=sortSsp
        SUB     C
        JNC     SETUP9
        SUB     A
SETUP9  CMP     D               ;flags = shortsp - RAWSSIZE
        MOV     A,B
        JC      SETUP11         ;jump here if no lights
SETUP10 ANI     1001$1111B      ;enable both lights
SETUP11 OUT     Latch
        ENDIF
;
        IF      NOT FIVE$WAY
SETUP7  OUT     Latch
        ENDIF
;
        IN      SWS
        ANI     0000$0100B      ;mask setup
        JZ      STP1            ;LOOP BACK TO TOP
;
;*****************************************************
;*      SETUP EXIT SECTION                           *
;*      this calibration assumes                     *
;*      a -.025 to +.025 stat range                  *
;*      the meter will go FSD at + or - .025         *
;*****************************************************
CALIBR  SUB     A               ;set scale to 0
        STA     scaleL          ;
        STA     scaleS
CALI1   LXI     H,scaleL
        LXI     B,calcLsp
        CALL    CalcSub
        SUI     100
        JNZ     CALI1
CALI2   LXI     H,scaleS
        LXI     B,calcSsp
        CALL    CalcSub
        ADI     100
        JNZ     CALI2
```

```
CALI3    LXI   H,HEADER
         CALL  PrnStr        ;print heading line
         LXI   H,SetupHead
         CALL  PrnStr        ;print heading line
         LDA   sortLsp
         CALL  UDM1
         MOV   A,H
         STA   targtL        ;for STATS
         CALL  PrnNumA       ;print sort long sp
         LDA   sortSsp
         CALL  UDM1
         MOV   A,H
         STA   targtS        ;for STATS
         CALL  PrnNumA       ;print sort short sp
         LDA   calcLsp
         CALL  UDM1
         MOV   A,H
         STA   trgtML        ;for STATS
         LDA   calcSsp
         CALL  UDM1
         MOV   A,H
         STA   trgtMS        ;for STATS
         CALL  NewLine
;
         MVI   A,0110$0110B
         OUT   Latch         ;kill the lights
         MVI   A,80H
         OUT   DTOA          ;zero the meter
         SUB   A
         MVI   B,10
         LXI   D,Counter
         LXI   H,Sec
CALI5    MVI   M,A
         STAX  D
         INX   H
         INX   D
         DCR   B
         JNZ   CALI5
         RET
;
CalcSub  INR   M
         SUB   A             ;A=0
         CMP   M             ;set flags  A still =0
         JZ    00
         LDAX  B
         CALL  UDM1
         DAD   H
         MOV   A,H           ;*
         RET
;
;*****************************************************
;*     SUBS for setup and mainline sections          *
;*        includes a multiplication routine          *
;*              a getsize routine                    *
;*              and calibration routine              *
;*                                                   *
;*****************************************************
;
```

```
;************************************************
;*      UP DATE METER ROUTINE                   *
;*      gets the current length (calls GETSIZE) *
;*      corrects the length                     *
;*      and up dates the meter                  *
;************************************************
UDMETER CALL  GETSIZE
UDM1    MOV   B,A              ;B= RAWSIZE
        ADI   128              ;set flags
        MOV   C,A              ;C= +,- RAWSIZE
        PUSH  B                ;save B=RAW C=+,-RAW
        LDA   scaleL
        JP    UDM2             ;jump if long
        LDA   scaleS
;
UDM2    MOV   B,A              ;B=scaleS C=+,-RAWSIZE
        LXI   H,0040H          ;initialize HL for roundoff
        MOV   D,H
        MOV   A,C
        ANA   A                ;check sign
        JP    UDMM1
        CMA
        INR   A
UDMM1   MOV   E,A              ;DE=abs(RAWSIZE)
;
        INR   B
UDMM3   DCR   B                ;B= counter (scale)
        JZ    UDMM5            ;EXIT if count up
        DAD   D                ;
        JNC   UDMM3            ;repeat if no overflow
;
UDMM4   LXI   H,3FFFH
UDMM5   PUSH  H
        LXI   D,1100$0000$0000$0000B
        DAD   D
        POP   H
        JC    UDMM4
        DAD   H                ;double the results
;
        MOV   A,C              ;complement HL if needed
        ANA   A                ;check sign
        JP    UDMM6
        SUB   A                ;
        SUB   H                ;
        MOV   H,A              ;2's complement of H
UDMM6   MOV   A,H              ;A=2*scale*size
        ADI   128              ;make it 0 to 255 output
        OUT   DTOA             ;output to the meter
        POP   D                ;D=RAWSIZE  E=+,-RAWSIZE
                               ;A=meter size
        RET                    ;H CONTAINS CORRECTED SIZE
;
;****************************************************
;*    GETSIZE TESTS THE A/D CONVERTERS 15 TIMES     *
;*    AND RETURNS THE AVERAGE OF 5 MEDIAN SIZES     *
;*    A,B,DE,&HL are destroyed, results in A        *
;****************************************************
GETSIZE LXI   H,GSDAT
        MVI   B,15             ;B = counter
GETS    OUT   PROBE            ;address error & start conversion
```

```
        CALL GETSIZ          ;delay & return size in A
        MOV  M,A             ;store size in table
        INX  H               ;next address
        DCR  B
        JNZ  GETS            ;repeat untill done
        LXI  H,GSDAT         ;table address
        MVI  B,15            ;table size counter
        CALL SortTab
        LXI  H,GSDAT+5
        MVI  B,5
        CALL Average
        RET
;
GETSIZ  MVI  A,DLA150        ;set delay for 150 micro s
GETS2   DCR  A
        JNZ  GETS2           ;delay loop
        IN   A$TO$D          ;get value
        RET
;
;***********************************************************
;*                                                         *
;*      MAIN LINE PROGRAM BEGINS HERE                      *
;*                                                         *
;***********************************************************
MAIN    PUSH D
        PUSH H
        MVI  A,0110$0110B    ;turn OFF latches & lights
        OUT  Latch
        LDA  GoodCount+2
        ADI  1
        CPI  100
        JNZ  Main0
        LHLD GoodCount
        INX  H               ;Increment total spring count
        SHLD GoodCount
        SUB  A
Main0   STA  GoodCount+2
        LXI  H,pitchtime
        SUB  A               ;A:=0
        CMP  M
        JZ   MAIN1           ;if pitch correction isn't done
        MOV  M,A             ; pitchtime:=0
        STA  expect          ; canx UDPITCH ( expect:=0 )
MAIN1   CALL UDMETER         ; H=corrected size
                             ; D=rawsize  E=scale
        EI                   ;enable Clock interrupt
;*** test for long spring ***
        MVI  B,1010$0110B    ;assume spring too long
        LDA  sortLsp         ;A:=sort long setpt
        CMP  D
        LDA  sortSsp         ;A:=sort short setpt
        JZ   Sort            ;sort if set_pt=rawsize
        JC   Sort            ;sort if rawsize>set_pt
;*** test for short spring ***
        CMP  D
        JC   UDPITCH         ;sort if rawsize<=set_pt else jump
        MVI  B,0101$0110B    ;enable sort short control & lamp
;*** sort the bad spring and increment ScrapCount ***
;
        IF   NOT FIVE$WAY
```

```
Sort        LDA   BadInRow
            INR   A
            STA   BadInRow        ;increment counter
            CPI   KILL$NUM
            JC    Sort0
            MOV   A,B
            ANI   1001$1111b
            MOV   B,A
Sort0       MOV   A,B
            ENDIF
;
            IF    FIVE$WAY
Sort        MOV   C,A             ;C=sortSsp
            LDA   sortLsp
            PUSH  A
            SUB   C
            MOV   C,A             ;C = sortLsp-sortSsp
            POP   A
            ADD   C               ;A = sortL + (sortL - sortS)
            JNC   Sort0
            MVI   A,255
Sort0       DCR   A
            CMP   D
            JC    Sort4
            LDA   sortSsp
            SUB   C
            JNC   Sort2
            MVI   A,0
Sort2       INR   A
            CMP   D
            JC    Sort6
Sort4       MOV   A,B
            ANI   1001$1111b
            MOV   B,A
Sort6       MOV   A,B
            ENDIF
;
            OUT   Latch
            LDA   ratesp
            STA   SortTime        ;set timmer value for countdown
            MOV   D,H             ;D = correct size
            LDA   GoodCount+2
            DCR   A
            JP    Sort8
            LHLD  GoodCount
            DCX   H
            SHLD  GoodCount
            MVI   A,99
Sort8       STA   GoodCount+2
            LDA   ScrapCount+2
            INR   A
            CPI   100
            JNZ   Sort10
            LHLD  ScrapCount
            INX   H
            SHLD  ScrapCount
            SUB   A
Sort10      STA   ScrapCount+2
            JMP   UDP0
;*** check for auto mode to update pitch correction ***
```

```
UDPITCH  MOV    D,H             ;D = corrected size
;
         IF     NOT FIVE$WAY
         SUB    A
         STA    BadInRow        ;clear counter
         ENDIF
;
UDP0     LDA    mode            ;load mode
         RRC                    ;put LSB in carry
         JC     UDTable         ;*EXIT*
         LDA    expect          ;get expected value
         ANA    A               ;if it's 0 then
         JZ     UDTable         ;*EXIT*
         LXI    H,pitch
         XRA    D               ;compare expected sign to this
         JM     LessAdj         ;change in sign detected
                                ;over adjustment assumed
         MOV    A,D
         ADI    128
         MOV    E,A             ;E=CORRECTED+128
         LDA    expect
         ADI    128             ;A=EXPECTED+128
         JC     UDP2            ;check sign(EXPECTED)
                                ;jump here means sign '-'
         CMP    E               ;EXPECTED - ACTUAL
         JC     MoreAdj         ;more pitch corredtion needed
UDP2     CMP    E               ;EXPECTED - ACTUAL
         JZ     SameAdj
         JNC    MoreAdj
         DCR    M
MoreAdj  INR    M               ;increase pitch correction
         JNZ    SameAdj         ;but not above 255
LessAdj  DCR    M               ;decrease pitch correction
         JNZ    SameAdj         ;but not to 0
         INR    M
SameAdj  SUB    A               ;A=0
         STA    expect          ;clear 'expect'
UDTable  MOV    B,D             ;B = corrected size
         LXI    H,RunDat        ;HL = pointer
         MVI    C,21            ;C = counter
         LXI    D,0             ;DE = subtotal
UDT0     MOV    A,M
         MOV    M,B
         MOV    B,A             ;swap
         INX    H               ;next pointer
         SUB    A
         SUB    B
         JP     UDT2
         MOV    A,B
UDT2     ADD    E               ;A=abs(error)
         MOV    E,A
         JNC    UDT4            ;DE=sum(abs(error))
         INR    D
UDT4     DCR    C
         JNZ    UDT0
         LXI    H,255           ;initialize for roundoff
         MVI    B,45
         MVI    A,127           ;A = 0111$1111
UDT6     DAD    D
         CMP    H               ;exit loop if 3sig>127
```

```
            JC      UDT8
            DCR     B
            JNZ     UDT6
            MOV     A,H             ;A=aprox(3sigma last 21)
UDT8        MOV     E,A
            LDA     RunDat
            MOV     D,A
ADJOUT      DI                      ;disable system clock
            MVI     H,0
            IN      Latch
            ANI     1111$1010B      ;enable adjust long light
            ORI     0000$1010B      ;enable adjust long latch
            MOV     B,A             ;B = long spring output
            ANI     1111$0101B      ;enable adjust short light
            ORI     0000$0101B      ;enable adjust short latch
            MOV     C,A             ;C = short spring output
            SUB     A
            SUB     D               ;A = -D = -CORRECTED SIZE
            JP      ADJ2            ;jump if spring short
            MOV     A,D             ;A = D = CORRECTED SIZE
            MOV     C,B             ;C = long spring output
ADJ2        MOV     B,A             ;B=ABS(error)  for ADJSUB
            CPI     4               ;if abs(error)<.0006"
            MOV     A,H             ; a=0 flags unchanged
            JC      MainEnd         ;not enough error
                                    ;****EXIT****
            IF      SIGN$CHECK
            LDA     RunDat+1
            XRA     D
            MOV     A,H             ; a=0 flags unchanged
            JM      MainEnd         ;change in sign detected
            LDA     RunDat+2        ;****EXIT****
            XRA     D
            MOV     A,H             ; a=0 flags unchanged
            JM      MainEnd         ;change in sign detected
            ENDIF                   ;****EXIT****
            MOV     A,C             ;
            OUT     Latch           ;output light and correction
            LDA     targtL
            CMP     E               ;flags = sort-3sig
            JNC     ADJ6
            MOV     A,E             ;sort pt was greater
ADJ6        CMP     B               ;flags = max - abs(actual)
            JNC     ADJ8
            MOV     B,A
ADJ8        LXI     H,128           ;HL = round off
            MOV     D,H             ;D=0
            LDA     pitch           ;B=abs(size)
            MOV     E,A             ;DE=pitch
            CALL    MUL16           ;HL=size*pitch
            DAD     H               ;HL=2*size*pitch
            LDA     mode
            ANI     0110$0000b
            CPI     0100$0000b
            MOV     A,H
            JZ      ADJ10
            JC      ADJ12
            STC                     ;slow
            CMC
            RAR
```

```
ADJ10    STC                  ;med
         CMC
         RAR
         JNC    ADJ12
         INR    A
ADJ12    CPI    4             ;reduce mechanical back lash
         JNC    ADJ14
         MVI    A,4
ADJ14    STA    pitchtime     ;A = weighted correction
         EI
         LXI    H,0
         LDA    RunDat
         MOV    E,A
         MOV    D,H           ;DE set for pos value
         ANA    A             ;test sign
         JP     ADJ9
         MVI    D,0FFH        ;size was negative
ADJ9     LDA    mode          ;bits 7,6,&5='n'
         MOV    B,A
         CALL   MUL16         ;HL=size*n=256*(EXPECTED SIZE)
         MOV    A,H
MainEnd  STA    expect
         EI                   ;enable system clock
         IN     SWS
         ANI    0100$0000B
         JNZ    MLOOP
         LDA    RunDat
         CALL   PrnNumA
         MVI    E,' '
         CALL   PrnChr
         LXI    H,counter
         DCR    M
         JP     MLOOP
         MVI    M,9
         CALL   NewLine
MLOOP    DB     RIM           ;8085 read interrupt mask
         ANI    0010$0000b
         JNZ    MLOOP         ;read still pending
         POP    H
         POP    D
         POP    B
         MVI    A,0000$1001B
         DB     SIM           ;Set interrupt mask
         POP    A
         RET
;
;
;***********************************************
;*     MACHINE CAPABILITY SECTION              *
;*     can be interrupted for READ             *
;*     with no ill effects                     *
;***********************************************
StdyOut  LXI    H,MCSHead
         CALL   PrnStr        ;print heading
         LXI    H,McsH1
         CALL   PrnStr
         CALL   NewLine
         LXI    H,0
         SHLD   Ranges        ;initial Range subtotal=0
         SUB    A
         STA    sample$num    ;initial sample count=0
```

```
          STA    MaxRange        ;initial max Range=0
          STA    MaxXbar         ;initial max Xbar
          STA    MinXbar         ;initial min Xbar
STDLOOP   LXI    H,sample$num    ;@sample$num=(0...19)
          LXI    B,0505H         ;# to move  (StatDat)
          SUB    A
STDL1     ADD    M
          DCR    C
          JNZ    STDL1           ;A= 5*sample#
          INR    M               ;increment sample#
          MOV    D,C
          MOV    E,A
          LXI    H,StatDat
          DAD    D               ;HL=destination
          LXI    D,RunDat        ;source
          CALL   MOVTAB          ;B=# to move
                                 ;DE contains starting pt for DoAll
          CALL   DoAll$1         ;sort,print,ave,&range
                                 ;C=Xbar A=Range
          MOV    E,A
          MVI    D,0             ;DE = A = last range
          LHLD   Ranges
          DAD    D
          SHLD   Ranges          ;range subtotal
          LXI    H,MaxRange
          CMP    M               ;flags (this$range-max$range)
          JC     STDL4
          MOV    M,A             ;update max$range
STDL4     MOV    A,C
          ADI    128
          MOV    B,A             ;B=this
          LXI    H,MaxXbar
          MOV    A,M
          ADI    128             ;A=max
          CMP    B               ;flags (max$Xbar-this$Xbar)
          JC     STDL6           ;jump to update MaxXbar
          LXI    H,MinXbar
          MOV    A,M
          ADI    128
          CMP    B               ;flags (min$Xbar-this$Xbar)
          JC     STDL8           ;jump not to update minXbar
STDL6     MOV    M,C             ;update max/min$Xbar
STDL8     CALL   NewLine         ;new line & 10 cpi
          LDA    sample$num
          SUI    20              ;see if we're done
          JNZ    TMUP
          STA    sample$num
          JMP    STDL2           ;****** EXIT
;
TMUP      MVI    A,0000$1001B
          DB     SIM             ;unmask the Read and Clock interrupts
          EI
          LXI    D,MCS$Delay-2-(Process$Delay*60)
          LHLD   StatClock       ;see if time is up
          DAD    D
          JNC    STDLOOP         ;if time up take sample
          IN     SWS
          ADD    A
          JC     TMUP            ;if not(abort) then wait
          LXI    H,0
```

```
        SHLD StatClock
        JMP  EXMCS         ;*** ABORT EXIT **********
;
;*** calculate stats for XBar & R charting ***
;*** calculate Average dev and STD dev ***
;***  assuming a population mean of 0   ***
STDL2   LXI  H,0
        SHLD Sigma3v       ;initialize
        SHLD AveDev        ;initialize
        MOV  C,H           ;C=0
        LXI  H,StatDat
        MVI  B,100
Sig0    SUB  A
        MOV  D,A           ;D=0
        SUB  M             ;A=-datum
        JZ   Sig5          ;if datum=0 skip it all
        JP   Sig1
        MOV  A,M
Sig1    MOV  E,A           ;DE=abs(datum(i))
        PUSH H
        LHLD AveDev
        DAD  D
        SHLD AveDev
        LHLD Sigma3v
Sig2    DAD  D
        JNC  Sig3
        INR  C             ; total carry bits
Sig3    DCR  A
        JNZ  Sig2          ;*** loop exit
Sig4    SHLD Sigma3v
        POP  H             ;restore memory pointer
Sig5    INX  H             ;A=0
        DCR  B
        JNZ  Sig0
        MOV  A,C
        STA  temp$c        ;8bit temp variable
;*** take forever 24bit square root ***
;*** uses AveDev for first aprox    ***
        LHLD AveDev        ;HL=100*AverageDeviation
        LXI  D,7           ;Round
        LXI  B,-13         ;Divisor
        CALL DIVSUB
        XCHG               ;HL = aprox(10*Std.Dev)
        SHLD temp$a        ;save calculate first guess
        SHLD temp$b        ;used for prevous guess
;*** check for fit by successive subtraction ***
Sqrt    MOV  A,H
        CMA
        MOV  B,A
        MOV  A,L
        CMA
        MOV  C,A
        INX  B             ; BC=-guess
        XCHG               ; DE = itteration counter
        LDA  temp$c
        LHLD Sigma3v       ; A+HL = 24bit number
Sqrt1   PUSH H
        LXI  H,1
        DCX  D
        DAD  D             ;if DE>=0 then carry=0
```

```
        POP   H
        JNC   Sqrt2          ;guess is too small
        LHLD  temp$a
        SHLD  temp$b         ;save prevous guess
        INX   H
        SHLD  temp$a         ;save new guess
        JMP   Sqrt           ;try again with new guess
Sqrt2   DAD   B              ;HL=HL-guess
        JC    Sqrt1          ;borrow=not(carry)
        SUI   1              ;borrow from A
        JNC   Sqrt1          ;if no carry then (OK to here , jump)
        LHLD  temp$b         ;   else (this guess too big)
        MOV   A,H            ;   test this guess > prevous guess
        CMA
        MOV   D,A
        MOV   A,L
        CMA
        MOV   E,A            ; DE=-(prevous guess)
        LHLD  temp$a         ; HL=(this guess)
        DAD   D              ; HL=(this guess)-(prevous guess)
        JC    Sqrt4          ; *** exit, sqrt found ***
        LHLD  temp$a
        SHLD  temp$b         ;save prevous guess
        DCX   H
        SHLD  temp$a.        ;save new guess
        JMP   Sqrt           ;try again
Sqrt4   LHLD  Temp$b
        SHLD  Sigma3v        ;Sigma3v=10*Std.Dev
;*** calculate 10*Std.Dev from AveDev
        LHLD  AveDev         ;HL=100*AverageDeviation
        MOV   A,H
        STC
        CMC                  ;carry cleared
        RAR                  ;A=AveDev/512
        ADD   L
        MOV   L,A
        MOV   A,H
        ACI   0
        MOV   H,A            ;HL=(513/512)100*AverageDeviation
        LXI   D,4            ;Round
        LXI   B,-8           ;Divisor
        CALL  DIVSUB         ;DE=expected(10*StdDev)
;*** calcualte abs(Sigma3v -10StdDev) ***
        LHLD  Sigma3v
        MOV   A,L
        SUB   E              ;DE=expected(10*StdDev)
        MOV   L,A
        MOV   A,H
        SBB   D
        MOV   H,A            ;HL= difference
        JNC   G2
        SUB   A
        SUB   L
        MOV   L,A
        MVI   A,0
        SBB   H
        MOV   H,A
;*** Gerig's test ***
;*** test to see if variation as measured by the
;*** standard deviation is in line with variation
```

```
;*** as measured by average deviation
G2      MOV     E,L
        MOV     D,H
        MVI     A,18
G4      DAD     D
        DCR     A
        JNZ     G4              ;best would be 19.17
        XCHG                    ;DE=19*abs(true10sig-expected10sig)
        LHLD    Sigma3v
        MOV     A,L
        SUB     E
        MOV     A,H
        SBB     D
        LXI     H,Normal$
        JNC     G5              ;if carry then test failed
        LXI     H,NotNormal$
G5      CALL    PrnStr
;*** test if process is centered
        LXI     H,StatDat
        MVI     B,100
        CALL    ADD128          ;add 128 to every table value
        CALL    Average
        XCHG                    ;make HL=subtotal X(i)
        SHLD    Mean            ;for later
        DAD     H
        LXI     D,3             ;for roundoff
        LXI     B,-6            ;divisor
        CALL    DIVSUB          ;DE to= 33.3Mean + 4267
        LXI     H,-4267
        DAD     D               ;HL = 33.33Mean
        JNC     C2              ;if the assumption for centering is
        MOV     A,H             ;true then .3sigma(x) >= abs(average x)
        CMA                     ;or 10sigma(x) >= 33.3*abs(average x)
        MOV     H,A             ;or still
        MOV     A,L             ;10sigma(x)-33.3*abs(average x) >= 0
        CMA
        MOV     L,A
        INX     H
C2      XCHG                    ;DE = -33.3*abs(average x)
        LHLD    Sigma3v         ;HL = 10sigma
        DAD     D
        LXI     H,Centered$
        JC      C4
        LXI     H,NotCentered$
C4      CALL    PrnStr          ;print message
;*** calculate UCLrange ***
        LHLD    Ranges          ;16bit 10(avg range)
        MOV     D,H
        MOV     E,L
        DAD     H               ;20
        DAD     H               ;40
        DAD     D               ;50
        DAD     H               ;100
        DAD     D               ;110(ave range)
        LXI     D,26            ;Round
        LXI     B,-52           ;Divisor
        CALL    DIVSUB
        XCHG
        SHLD    UCLrange
;*** calculate UCLx(v) ***
```

```
        LHLD Sigma3v      ;16bit 5(sigma)
        MOV  D,H
        MOV  E,L
        DAD  H            ;10
        DAD  H            ;20
        DAD  D            ;25
        DAD  H            ;50
        DAD  D            ;55(ave range)
        LXI  D,21
        LXI  B,-41
        CALL DIVSUB
        XCHG              ;HL=3*StdDev/(5^.5)
        SHLD UCLxbar      ;** store for later use
;*** test if process in control ***
        XCHG
        LDA  MaxXbar
        ADD  A
        DCR  A
        CMP  E            ;flags for MaxXbar-1-UCLxbar
        LXI  H,OutControl$
        JP   Con0
        LDA  MinXbar
        CMA
        ADD  A
        CMP  E            ;flags for (-MinXbar-1)-UCLxbar
        JP   Con0
        PUSH H            ;save string pointer
        LDA  MaxRange
        CMA
        INR  A
        MOV  L,A          ;L = -MaxRange
        MVI  H,0FFh       ;H set for neg number
        DAD  H            ;HL = -MaxRange(16bit)
        XCHG              ;DE = -MaxRange(16bit)
        LHLD UCLrange
        DAD  D            ;HL = UCLr - MaxRange
        POP  H            ;HL = OutControl$
        JNC  Con0
        LXI  H,InControl$
Con0    CALL PrnStr       ;print message
;*** Print header & calculated Data ***
        LXI  H,StatHead
        CALL PrnStr
;*** print 5 average deviation ***
        LHLD AveDev       ;16bit 50(average dev)
        LXI  D,5
        LXI  B,-10
        CALL DIVSUB
        XCHG              ;HL=5*AveDev
        CALL MEDNUM
;*** print 4 sigma ***
        LHLD Sigma3v      ;16bit 5(sigma)
        DAD  H
        DAD  H
        DAD  H            ;HL=40*StdDev
        LXI  D,5
        LXI  B,-10
        CALL DIVSUB
        XCHG              ;HL=4*StdDev
        CALL MEDNUM
```

```
;*** print 4 sigma(range) ***
        LHLD Ranges        ;16bit 10(avg range)
        MOV  D,H
        MOV  E,L
        DAD  H             ;20
        DAD  H             ;40
        DAD  D             ;50
        DAD  H             ;100
        DAD  D             ;110(ave range)
        LXI  D,32          ;Round
        LXI  B,-64         ;Divisor
        CALL DIVSUB
        XCHG               ;HL =  4*sigma(r)
        CALL MEDNUM        ;unsigned 16 bit number
;*** print 3 sigma ***
        LHLD Sigma3v       ;16bit 5(sigma)
        DAD  H             ;10
        MOV  D,H
        MOV  E,L
        DAD  D             ;20
        DAD  D             ;HL=30*StdDev
        LXI  D,5
        LXI  B,-10
        CALL DIVSUB
        XCHG               ;HL=3*StdDev
        SHLD Sigma3v       ;** store for later use
        CALL MEDNUM
;*** print 3 sigma(range) ***
        LHLD Ranges        ;16bit 10(avg range)
        DAD  H             ;20
        DAD  H             ;40
        DAD  H             ;80
        LXI  D,31          ;Round
        LXI  B,-62         ;Divisor
        CALL DIVSUB
        XCHG               ;HL =  3*sigma(r)
        CALL MEDNUM        ;unsigned 16 bit number
;*** print UCLx (v) ***
        LHLD UCLxbar
        CALL MEDNUM
;*** print Mean ***
        LHLD Mean          ;16bit 50*(Mean+256)
        LXI  D,25          ;for roundoff
        LXI  B,-50         ;divisor
        CALL DIVSUB        ;DE to= Mean + 256
        LXI  H,-256
        DAD  D             ;HL = 2*Mean
        SHLD Mean          ;** save for later use
        CALL SMedNum       ;signed 16 bit number
;*** print UCLrange ***
        LHLD UCLrange
        CALL MEDNUM
;*** print R bar ***
        LHLD Ranges        ;16bit 10(avg range)
        LXI  D,5           ;Round
        LXI  B,-10         ;Divisor
        CALL DIVSUB
        XCHG
        CALL MEDNUM
        CALL NewLine
```

```
        JMP    Chart            ;print xbar r chart Histo
                                ;*** routine returns from Chart ***
;
;*********************************************
;*      STATISTICAL OUTPUT SECTION           *
;*      can be interrupted for READ          *
;*      with no ill effects                  *
;*********************************************
AutoStatOut
        LXI    B,0
ASO     LDA    GoodCount+2
        LXI    H,ScrapCount+2
        ADD    M
        LXI    H,RunTestCount
        CMP    M
        MOV    M,A
        JNZ    ManStatOut       ;coiler is running
        INR    C
        JNZ    ASO
        INR    B
        JNZ    ASO              ;coiler not running
        LXI    H,( Process$Delay * 2 + 1 )
        SHLD   StatClock
        JMP    SBO
ManStatOut
        LXI    H,sample$num
        INR    M
        MOV    A,M
        CPI    1
        JNZ    StOut2
        LXI    H,SQCHead
        CALL   PrnStr
        LXI    H,HEADER
        CALL   PrnStr
        MVI    E,ESC$
        CALL   PRNCHR
        MVI    E,'Q'
        CALL   PRNCHR
        LXI    H,McsH1
        CALL   PrnStr
        LXI    H,SqcH1
        CALL   PrnStr
        CALL   NewLine
        SUB    A
        STA    MaxXBar
        STA    MinXBar
        STA    MaxRange
StOut2  MVI    E,ESC$
        CALL   PRNCHR
        MVI    E,'Q'
        CALL   PRNCHR
        LDA    sample$num
        MOV    B,A
        ADD    A
        ADD    A
        ADD    B
        LXI    D,StatDat-5
        MVI    H,0
        MOV    L,A
```

```
        DAD   D              ;HL = destination
        LXI   D,RunDat       ;DE = source
        MVI   B,5            ;# to move
        PUSH  H
        CALL  MOVTAB
        CALL  MOVTAB          ;makes a second copy
        POP   D
        CALL  DoAll$1          ;sort,print,ave,&range
                              ;C=Xbar A=Range
        LXI   H,MaxRange
        CMP   M               ;flags (this$range-max$range)
        JC    StOut8
        MOV   M,A             ;update max$range
StOut8  MOV   A,C
        ADI   128
        MOV   B,A             ;B=this
        LXI   H,MaxXbar
        MOV   A,M
        ADI   128             ;A=max
        CMP   B               ;flags (max$Xbar-this$Xbar)
        JC    StOut10         ;jump to update MaxXbar
        LXI   H,MinXbar
        MOV   A,M
        ADI   128
        CMP   B               ;flags (min$Xbar-this$Xbar)
        JC    StOut12         ;jump not to update minXbar
StOut10 MOV   M,C             ;update max/min$Xbar
StOut12 LDA   GoodCount+2
        MOV   D,A             ;D= last 2 digits of good count
        LDA   sample$num
        MOV   B,A
        ADD   A
        ADD   A
        ADD   B
        LXI   B,StatDat
        MVI   H,0
        MOV   L,A
        DAD   B               ;HL = source
        PUSH  H
        PUSH  H               ;SP = destination
        MVI   B,5             ;B=5
        MOV   C,B             ;C=5
        JMP   StOut14
        ORG   PatchEnd+1
;****************************************************
;*      STRINGS FOR STAT PRINTOUT                   *
;****************************************************
Normal$         DB    'Normality test passed. ',0
NotNormal$      DB    'NORMALITY TEST NOT PASSED! ',0
Centered$       DB    'Process centered. ',0
NotCentered$    DB    'PROCESS NOT CENTERED! ',0
InControl$      DB    'Control test passed.',CR$,LF$,0
OutControl$     DB    'CONTROL TEST NOT PASSED!',CR$,LF$,0
StatHead        DB    '  5ad    4',0b1h,'(v)   4',0b1h,'(r)   3'
                DB    0b1h,'(v) 3',0b1h,'(r) UCLx(v)  '
                DB    'mean    UCLr    Rbar',CR$,LF$,0
McsH1           DB    ' Time    Mode   Good    Bad   '
SqcH1           DB    ' <------Grouped data------> Xbar Range',0
SQCHead         DB    CR$,LF$,14,ESC$,'N   PROCESS SQC DATA',15,0
SetupHead       DB    'Timers and Counters initialized , '
```

```
              DB      ' gage rejects at ',0
;
StOut14 MOV   A,M
        ADI   128
        MOV   E,A           ;E = table value
        LDA   targtL
        ADI   127
        CMP   E             ;compair to Sort Long
        JC    StOut16       ;spring is >= setpt
        LDA   targtS
        ADI   128
        CMP   E             ;compair to Sort Short
        JNC   StOut16       ;spring is <= setpt
        MOV   A,M           ;load good value
        XTHL
        MOV   M,A           ;store good value
        DCR   B             ;count 1 good spring
        JZ    StOut20       ;********** GOOD EXIT *****
;
        INX   H             ;next destination
        XTHL
StOut16 INX   H             ;next source address
        DCR   C             ;count iteration
        JNZ   StOut14       ;do it again if not done
;
        INR   C             ;reset iteration counter
        DCX   H             ;reset source
StOut18 LDA   GoodCount+2
        CMP   D
        JZ    StOut18       ;wait until another good spring
        MOV   D,A
        LDA   RunDat
        MOV   M,A
        JMP   StOut14       ;try again
;
StOut20 POP   D
        POP   H
        CALL  DoAll$3
StOut22 CALL  NewLine       ;new line and 10cpi
        LDA   sample$num
        CPI   20
        JNZ   SB0           ;***** EXIT *****
;
;*** test if process is centered
StOut24 LXI   H,StatDat
        MVI   B,100
        CALL  ADD128        ;add 128 to every table value
        CALL  Average
        XCHG                ;make HL=subtotal X(i)
        SHLD  Mean          ;for later
        DAD   H
        LXI   D,3           ;for roundoff
        LXI   B,-6          ;divisor
        CALL  DIVSUB        ;DE to= 33.3Mean + 4267
        LXI   H,-4267
        DAD   D             ;HL = 33.33Mean
        JNC   StOut5        ;if the assumption for centering is
        MOV   A,H           ;true then .3sigma(x) >= abs(average x)
        CMA                 ;or 10sigma(x) >= 33.3*abs(average x)
        MOV   H,A           ;or still
```

```
            MOV     A,L             ;10sigma(x)-33.3*abs(average x) >= 0
            CMA
            MOV     L,A
            INX     H
StOut5      XCHG                    ;DE = -33.3*abs(average x)
            LHLD    Sigma3v         ;HL = 10sigma
            DAD     D
            LXI     H,Centered$
            JC      StOut7
            LXI     H,NotCentered$
StOut7      CALL    PrnStr          ;print message
;*** test if process in control ***
            LHLD    UCLxbar
            XCHG
            LDA     MaxXbar
            ADD     A
            DCR     A
            CMP     E               ;flags for MaxXbar-1-UCLxbar
            LXI     H,OutControl$
            JP      StOut9
            LDA     MinXbar
            CMA
            ADD     A
            CMP     E               ;flags for (-MinXbar-1)-UCLxbar
            JP      StOut9
            PUSH    H               ;save string pointer
            LDA     MaxRange
            CMA
            INR     A
            MOV     L,A             ;L = -MaxRange
            MVI     H,0FFh          ;H set for neg number
            DAD     H               ;HL = -MaxRange(16bit)
            XCHG                    ;DE = -MaxRange(16bit)
            LHLD    UCLrange
            DAD     D               ;HL = UCLr - MaxRange
            POP     H               ;HL = OutControl$
            JNC     StOut9
            LXI     H,InControl$
StOut9      CALL    PrnStr          ;print message
;
;*************************************************
;*      X-BAR and R Chart                        *
;*************************************************
;*** print Xbars ***
;*** set printer for line spacing ***
Chart       MVI     E,ESC$          ;escape command for C-Itoh
            CALL    PrnChr
            MVI     E,'T'           ;command for line spacing
            CALL    PrnChr
            LHLD    UCLxbar         ;HL=UCLx
            MOV     A,L
            ADI     1               ;increment and init CY
            RAR                     ;A=UCLR/2
            LXI     H,MaxXbar
            MOV     B,A             ;save UCLx
            CMP     M               ;flags=UCLx-MaxXbar
            JNC     Chart0
            MOV     B,M             ;save MaxXbar instead
Chart0      LXI     H,MinXbar
            CMA
```

```
        INR     A               ;A=LCLx
        MOV     C,A             ;save LCLx
        CMP     M               ;flags=LCLx-MinXbar
        JC      Chart2
        MOV     C,M             ;save MinXbar instead
Chart2  MVI     A,128
        ADD     C
        MOV     C,A             ;C = stop value
        MVI     A,128
        ADD     B
        MOV     B,A             ;B = start value
        SUB     C               ;C = stop value
        MOV     H,A             ;H = max # lines of data
        MVI     L,216           ;L = lines in 1.5 in)
        MVI     D,'0'
        MOV     E,D
;** calculate # lines / itteration
Chart6  INR     D
        MOV     A,D
        CPI     ':'             ;check for unit digit overflow
        JNZ     Chart8
        INR     E               ;if true increment tens
        MVI     D,'0'           ;and units=0
Chart8  MOV     A,L
        SUB     H
        MOV     L,A             ;find n where
        JNC     Chart6          ;212 < n*LinesToPrint
;** output last 2 spacing bytes to printer
        CALL    PrnChr
        MOV     E,D
        CALL    PrnChr
;*** Start Outer Loop ***
Chart10 SUB     A
        STA     sample$num      ;initialize to 0
        LHLD    UCLxbar
        MOV     A,L
        ADI     1
        RAR                     ;A=UCLx/2
        ADI     128
        CMP     B               ;see if current = UCLx
        JZ      Chart11         ;print UCLx line
        CMA
        INR     A               ;A=-A
        CMP     B               ;see if current = LCLx
        JZ      Chart11         ;print LCL line
        MVI     A,128
        CMP     B               ;see if current = 0
        JNZ     Chart13         ;print 0 line
Chart11 MVI     A,60
        MVI     E,241           ;broken line character
Chart12 Call    PrnChr
        DCR     A
        JNZ     Chart12
        PUSH    B
        MOV     A,B
        ADI     128
        CALL    PrnNumA         ;print line value
        POP     B
        MVI     E,CR$           ;print carrage return
        Call    PrnChr
```

```
;*** Start Inner Loop ***
Chart13  LXI   H,sample$num       ;Top of Inner Loop
         MOV   A,M
         CPI   20
         JZ    Chart22            ;*** INNER LOOP EXIT ***
         ADD   A
         ADD   A
         ADD   M                  ;A = 5*sample#
         INR   M                  ;increment sample#
         LXI   H,StatDat
         ADD   L
         MOV   L,A                ;HL=Starting point
         MVI   D,5                ;group size
         MOV   A,D                ;A=5
         MVI   E,0                ;E=0
Chart15  ADD   M                  ;add each datum
         JNC   Chart16            ;two times and
         INR   E                  ;keep track of CY
Chart16  ADD   M
         JNC   Chart17
         INR   E
Chart17  INX   H                  ;increment pointer
         DCR   D                  ;decrement loop counter
         JNZ   Chart15            ;when done =10*Xbar+5
         MOV   L,A
         MOV   H,E
         LXI   D,-10
         MOV   A,D                ;A=FFh
Chart18  INR   A
         DAD   D
         JC    Chart18
;
         MVI   E,' '
         CALL  PrnChr
         CALL  PrnChr
         CMP   B                  ;see if XBar=current line value
         JNZ   Chart20
         MVI   E,240              ;print a big X
Chart20  CALL  PrnChr             ;print either spaces or a mark
         JMP   Chart13            ;bottom of inner loop
;*** END of inner loop ***
Chart22  MVI   E,CR$
         CALL  PrnChr
         MVI   E,LF$
         CALL  PrnChr
         MOV   A,C
         CMP   B
         JZ    Chart23
         DCR   B                  ;next shorter Xbar
         JMP   Chart10            ;goto top of outer loop
;*** END of outer loop ***
;
;*** Range Chart ***
;*** set printer for line spacing ***
Chart23  MVI   E,ESC$             ;escape command for C-Itoh
         CALL  PrnChr
         MVI   E,'T'              ;command for line spacing
         CALL  PrnChr
         MVI   E,'2'
         CALL  PrnChr
```

```
        MVI    E,'4'
        CALL   PrnChr          ;printer set for 6 lines/inch
        MVI    E,LF$           ;a little space between charts
        CALL   PrnChr
        MVI    E,CR$
        CALL   PrnChr
        MVI    E,ESC$          ;escape command for C-Itoh
        CALL   PrnChr
        MVI    E,'T'           ;command for line spacing
        CALL   PrnChr
        LHLD   UCLrange        ;HL=UCLrange
        INX    H
        MOV    A,H             ;increment and divide by 2
        ANA    A
        RAR
        MOV    B,A
        MOV    A,L
        RAR
        MOV    C,A             ;BC = .5HL = UCLr
        SUB    A
        CMP    B               ;if B<>0 then UCLr>MaxR
        JNZ    Chart30
        LDA    MaxRange
        CMP    C               ;flags=MaxR-UCLr
        JC     Chart30
        MOV    C,A             ;save MaxRange instead
Chart30 PUSH   B               ;save for later
        MOV    A,B
        CMA
        MOV    B,A
        MOV    A,C
        CMA
        MOV    C,A
        INX    B               ;BC = -(biggest to print)
        LXI    H,216           ;L = lines in 1.5 in)
        MVI    D,'0'
        MOV    E,D
;** calculate # lines / itteration
Chart32 INR    D
        MOV    A,D
        CPI    ':'             ;check for unit digit overflow
        JNZ    Chart34
        INR    E               ;if true increment tens
        MVI    D,'0'           ;and units=0
Chart34 DAD    B               ;find n where
        JC     Chart32         ;212 < n*LinesToPrint
;** output last 2 spacing bytes to printer
        CALL   PrnChr
        MOV    E,D
        CALL   PrnChr
        POP    B               ;current value
;*** Start Outer Loop ***
Chart36 SUB    A
        STA    sample$num      ;initialize to 0
        LHLD   UCLrange        ;HL=UCLrange
        INX    H
        MOV    A,H             ;increment and divide by 2
        ANA    A
        RAR
        MOV    H,A
```

```
        MOV   A,L
        RAR
        MOV   L,A       ; UCLr (8bit)
        CMP   C         ;compair low bytes
        JNZ   Chart38   ;no line needed
        MOV   A,H
        CMP   B         ;compair hi bytes
        JZ    Chart44   ;print UCLr line
Chart38 SUB   A
        CMP   B
        JNZ   Chart50   ;skip following if not 0
        CMP   C
        JZ    Chart44   ;if 0 print 0 line
        MVI   A,121
        LXI   D,0
        XCHG
Chart40 DAD   D
        DCR   A
        JNZ   Chart40
        MOV   A,H
        CMP   C
        JNZ   Chart50   ;no line needed
Chart44 MVI   A,60
        MVI   E,241     ;broken line character
Chart48 Call  PrnChr
        DCR   A
        JNZ   Chart48
        PUSH  B
        POP   H
        PUSH  H
        DAD   H
        CALL  MEDNUM    ;print line value
        POP   B
        MVI   E,CR$     ;print carrage return
        Call  PrnChr
;*** Start Inner Loop ***
Chart50 LXI   H,sample$num      ;Top of Inner Loop
        MOV   A,M
        CPI   20
        JZ    Chart54   ;*** INNER LOOP EXIT ***
        ADD   A
        ADD   A
        ADD   M         ;A = 5*sample#
        INR   M         ;increment sample#
        LXI   H,StatDat
        ADD   L
        MOV   L,A       ;@largest
        MOV   D,M
        ADI   4
        MOV   L,A       ;@smallest
        MOV   A,D
        SUB   M         ;A=Range
        MVI   B,' '
        CALL  PrnChr
        CALL  PrnChr
        CMP   C         ;see if XBar=current line value
        JNZ   Chart52
        SUB   A
        CMP   B
        JNZ   Chart52
```

```
            MVI    E,'R'
Chart52 CALL   PrnChr        ;print either spaces or a mark
            JMP    Chart50       ;bottom of inner loop
;*** END of inner loop ***
Chart54 MVI    E,CR$
            CALL   PrnChr
            MVI    E,LF$
            CALL   PrnChr
            SUB    A
            CMP    C
            JNZ    Chart56
            CMP    B
            JZ     Chart58       ;***
Chart56 DCX    B             ;next shorter Xbar
            JMP    Chart36       ;goto top of outer loop
;
Chart58 MVI    E,ESC$        ;escape command for C-Itoh
            CALL   PrnChr
            MVI    E,'T'         ;command for line spacing
            CALL   PrnChr
            MVI    E,'2'         ;escape command for C-Itoh
            CALL   PrnChr
            MVI    E,'4'         ;command for line spacing
            CALL   PrnChr
;
HistoG  LXI    H,StatDat
            MVI    B,100
            CALL   SortTab       ;order StatDat
            LDA    StatDat+99
            CMA
            INR    A
            ADD    M             ;A = total range
            MVI    C,0
Histo1  INR    C
            SUI    7
            JNC    Histo1        ;C = A/7
            MOV    A,C
            ORI    0000$0001B    ;be sure C is odd
            MOV    C,A
            RAR
            CMA
            ADI    129           ;A = boundry below 0
Histo2  ADD    C
            JC     Histo4
            CMP    M             ;initial test size
            JC     Histo2        ;exit loop when A >= @HL
Histo4  SUB    C             ;A = starting boundry
Histo6  STA    StatDat+100       ;save boundry
            SHLD   StatDat+101       ;save pointer
            MVI    H,0
Histo8  MOV    L,A           ;HL = boundry
            MVI    E,CR$
            CALL   PrnChr
            MVI    E,LF$
            CALL   PrnChr        ;start a new line
            PUSH   B
            DAD    H             ;HL = boundry(2byte)
            LXI    D,-257
            DAD    D
            MVI    D,0
```

```
           MOV   E,C
           DAD   D           ;HL = center value(2byte)
; if +-64 HL*5/2 here
           CALL  SMedNum     ;print signed 2byte number
           POP   B
           LHLD  StatDat+101    ;recall pointer
           LDA   StatDat+100    ;recall boundry
Histo10    CMP   M           ;compair to test size
           JZ    Histo12
           JC    Histo12
           SUB   C
           JNC   Histo6
           MOV   E,A
           SUB   A           ;A = 0
           STA   StatDat+100    ;save boundry
           SHLD  StatDat+101    ;save pointer
           MVI   H,0FFh
           MOV   A,E
           JMP   Histo8
;
Histo12    PUSH  A
           MVI   E,'S'
           MVI   A,50
           CMP   B
           JZ    Histo14
           MVI   E,'M'
           MVI   A,49
           CMP   B
           JZ    Histo14
           MVI   E,'*'
Histo14    POP   A
           CALL  PRNCHR
           INX   H           ;next address
           DCR   B
           JNZ   Histo10
;
EXMCS      Call  NewLine
           SUB   A
           STA   sample$num  ;set sample# = 0
           JMP   SB1
;
;*****************************************************
;*         SUBROUTINES                                *
;*****************************************************
;*PRINTS BBIIGG NUMBERS***
SMedNum    MOV   A,H
           ADD   A
           JNC   MEDNUM
           SUB   A
           SUB   L
           MOV   L,A
           MVI   A,0
           SBB   H
           MOV   H,A
           MVI   E,'-'
           JMP   MedNum2
MEDNUM     MVI   E,' '
MedNum2    CALL  PRNCHR
MedNum4    LXI   B,FSD*200   ;load divisor
           CALL  SOASUB
```

```
        LXI   B,FSD*20     ;load divisor
        CALL  SOASUB
        LXI   B,FSD*2      ;load divisor
        CALL  SOASUB
        MVI   E,'.'
        CALL  PRNCHR
;
        IF    METER64
        MOV   C,L
        MOV   B,H
        DAD   H
        DAD   H
        DAD   B
        LXI   B,4
        JMP   MedNum6
        ENDIF
;
        IF    METER128
        SUB   A
        CMP   L
        JZ    MedNum3
        MVI   L,5
        ENDIF
;
        IF    NOT METER12
        last$divisor   EQU    1
        ENDIF
;
        IF    METER12
        last$divisor   EQU    2
        ENDIF
;
MedNum3 LXI   B,last$divisor
MedNum6 CALL  SOASUB
        MVI   E,' '
        CALL  PRNCHR
        RET
;
NumOut16
        LXI   B,10000      ;load divisor
        CALL  SOASUB
        LXI   B,1000       ;load divisor
        CALL  SOASUB
        LXI   B,100        ;load divisor
        CALL  SOASUB
        LXI   B,10         ;load divisor
        CALL  SOASUB
        LXI   B,1
        CALL  SOASUB
        RET
;
NumOut8 LXI   B,10
        CALL  SOASUB
        JMP   MedNum3
;
;******SUB USED TO PRINT BIG DEC NUMBERS*****
SOASUB  MVI   E,'/'
SOASUB1 INR   E
        MOV   A,L
        SUB   C
```

```
                MOV     L,A
                MOV     A,H
                SBB     B
                MOV     H,A
                JNC     SOASUB1
                CALL    PRNCHR
                DAD     B
                RET
;
;
;******SUB TO MULTIPLY TWO NUMBERS*****
MUL16           DAD     D
                DCR     B
                JNZ     MUL16
                RET
;
;******SUB TO HELP DIVISION *****
DIVSUB          DAD     D               ;add .5*divisor for round
                LXI     D,-1
DIVSUB1         INX     D               ;DE=-(dividend)
                DAD     B               ;BC=-(divisor)
                JC      DIVSUB1
                MOV     A,E
                RET
;
;***********************************************
;*      move a table B long from DE to HL              *
;***********************************************
MOVTAB          PUSH    B
                PUSH    H
                DI
MVTB            LDAX    D
                MOV     M,A
                INX     D
                INX     H
                DCR     B
                JNZ     MVTB
                EI                      ;HL= last destination+1
                POP     D               ;origional destination
                POP     B               ;origional counter
                RET
;
;***********************************************
;*              starts a new line                      *
;***********************************************
NewLine         PUSH    D
                MVI     E,ESC$
                CALL    PRNCHR
                MVI     E,'N'
                CALL    PRNCHR
                MVI     E,CR$
                CALL    PRNCHR
                MVI     E,LF$
                CALL    PRNCHR
                POP     D
                RET
;
;***********************************************
;* Prints 5 sizes , average , & range           *
;***********************************************
```

```
DoAll$1  PUSH  D              ;save DoAll start address
         LDA   Hrs
         CALL  DECNUM          ;print hours
         LDA   Min
         CALL  DECNUM2         ;print :min
         LDA   Sec
         CALL  DECNUM2         ;print :seconds
         POP   H               ;restore DoAll address
DoAll$2  MVI   E,' '
         CALL  PRNCHR
         LDA   mode
         RAR                   ;test LSB
         MVI   E,'A'
         JNC   SETNG1
         MVI   E,'M'
SETNG1   CALL  PRNCHR
         STC
         RAL
         MVI   E,'M'
         CPI   1100$0001B
         JZ    SETNG2
         MVI   E,'F'
         JC    SETNG2
         MVI   E,'S'
SETNG2   CALL  PRNCHR
         LDA   pitch
         CALL  DECNUM3
         MVI   E,' '
         CALL  PRNCHR
Counts   PUSH  H
         LHLD  GoodCount
         CALL  NumOut16
         LDA   GoodCount+2
         MVI   H,0
         MOV   L,A
         CALL  NumOut8
         LHLD  ScrapCount
         Call  NumOut16
         LDA   ScrapCount+2
         MVI   H,0
         MOV   L,A
         CALL  NumOut8
         POP   H
DoAll$3  PUSH  H
         MVI   B,5
         CALL  ADD128
         CALL  SortTab         ;sorts the list
         CALL  Average         ;gets the average
         ADI   128
         MOV   C,A             ;PUSH A
         CALL  ADD128
         CALL  PRNLST          ;print list
         MVI   E,' '
         CALL  PrnChr
         MOV   A,C             ;POP  A
         CALL  PrnNumA
         MVI   E,' '
         CALL  PrnChr
         POP   H
         PUSH  H               ;starting address
```

```
        MOV   A,M           ;A contains largest size
        LXI   D,4
        DAD   D
        SUB   M             ;subtract smallest
        PUSH  A             ;A contains range
        CALL  POSNUM        ;print range
        MVI   E,' '
        CALL  PRNCHR
        MVI   E,' '
        CALL  PRNCHR
        LXI   H,(Process$delay*60+1)
        SHLD  StatClock
        POP   A
        POP   H
        RET
;
;*******************************************************
;* Prints a list B long, starting at HL                *
;* All registers lost except BE & HL                   *
;*******************************************************
PRNLST  PUSH  H
        PUSH  B
        MOV   D,B           ;move counter to D
PRNLS   CALL  PrnNumM       ;print number & tab
        INX   H
        MVI   E,' '
        CALL  PRNCHR
        DCR   D
        JNZ   PRNLS
        POP   B             ;restore counter
        POP   H             ;restore starting address
        RET
;
;*******************************************************
;*      prints a 2 digit signed #                      *
;*      whos address is lodated in (HL)                *
;*      destroys A,BC,E                                *
;*      calls PRNCHR                                   *
;*******************************************************
PrnNumM MOV   A,M
PrnNumA ANA   A
        JP    POSNUM
        CMA
        INR   A
        MVI   E,'-'         ;number is -
        JMP   PrnNum1
;
        IF    METER25 OR METER12
POSNUM  MVI   E,' '         ;number is pos
PrnNum1 CALL  PrnChr
        ENDIF
;
        IF    METER64
POSNUM  MVI   E,'1'
        SUI   200
        JNC   PrnNum1
        MVI   E,' '
        ADI   200 .
PrnNum1 CALL  PrnChr
        ENDIF
```

```
;
        IF    METER128
POSNUM  MVI   E,' '
PrnNum1 CALL  PrnChr
        MVI   B,FSD*100
        CALL  PRNMSUB
        ENDIF
;
        MVI   B,FSD*10      ;load divisor
        CALL  PRNMSUB
HTIMER  EQU   1DH           ;mode + upper 6 bits
;
PROBE   EQU   28H           ;A/D size (osc board)
A$TO$D  EQU   PROBE         ;for A to D  read
POTRATE EQU   29H           ;A/D sort rate pot
POTCORR EQU   2AH           ;A/D correction pot
;
EPROM2  EQU   48H           ;Address base for 2nd Eprom I/O
;
SIM     EQU   30H
RIM     EQU   20H
CR$     EQU   13
LF$     EQU   10
TAB$    EQU   9
ESC$    EQU   27
SPACE$  EQU   32
RAMTOP  EQU   18FFH         ;initial stack
DLA150  EQU   30            ;for 6.144 clock
        MVI   B,FSD         ;load divisor
        CALL  PRNMSUB
;
        IF    METER12
        MVI   E,'.'
        CALL  PrnChr
        ENDIF
;
        IF    METER25
        MVI   E,'.'
        CALL  PrnChr
        ADD   A
        ENDIF
;
        IF    METER64
        MVI   E,'.'
        CALL  PrnChr
        JZ    NUMEND
        ADI   4
        ENDIF
;
        IF    METER128
        MVI   E,' '
        CALL  PrnChr
        RET
        ENDIF
;
NUMEND  ADI   '0'
        MOV   E,A
        CALL  PrnChr
        RET
;
```

```
PRNMSUB  MVI   E,'/'
PrnNum7  SUB   B
         INR   E
         JNC   PrnNum7
         ADD   B
         CALL  PrnChr      ;print units
         RET
;*****************************************************
;*    prints dec value of whatever is in A           *
;*****************************************************
DECNUM3  MVI   B,100
         CALL  PRNMSUB
         JMP   DECNUM
DECNUM2  MVI   E,':'
         CALL  PRNCHR
DECNUM   MVI   B,10        ;load divisor
         CALL  PRNMSUB
         JMP   NUMEND      ;for exit
;
;*****************************************************
;*    adds 128 to every value in a table             *
;*****************************************************
ADD128   PUSH  H
         mode       DS    1     ;mode in hbyte N in lbyte
         ratesp     DS    1
         sortSsp    DS    1
         calcSsp    DS    1
         calcLsp    DS    1
         sortLsp    DS    1
         pitch      DS    1
         expect     DS    1
         scaleL     DS    1
         scaleS     DS    1
         targtL     DS    1
         trgtML     DS    1
         trgtMS     DS    1
         targtS     DS    1
         RunDat     DS    22    ;running data table
         GSDAT      DS    16    ;GET SIZE table
;*** clock variables ***
         Sec        DS    1
         Min        DS    1
         Hrs        DS    1
         SyClk1     DS    1
         StatClock  DS    2
         SortTime   DS    1
         pitchtime  DS    1
;*** stat variables ***
         MaxRange   DS    1
         MaxXbar    DS    1
         MinXbar    DS    1
         Sigma3v    DS    2
         AveDev     DS    2
         Ranges     DS    2
         Mean       DS    2
         UCLxbar    DS    2
         UCLrange   DS    2
         temp$a     EQU   Mean
         temp$b     EQU   UCLxbar
         temp$c     EQU   UCLrange
```

```
            StatDat         DS      105     ;STAT data table
            counter         DS      1
            sample$num      DS      1
            ScrapCount      DS      3
            GoodCount       DS      3
            RunTestCount    DS      1
            BadInRow        DS      1
;
DTOA        EQU     0H              ;port A address
SWS         EQU     1H              ;port B address
DTOAC       EQU     2H              ;control A
SWSC        EQU     3H              ;control B
;
CSR         EQU     18H             ;control
LPOUT       EQU     19H             ;line printer port A
Latch       EQU     1AH             ;latch port B
ATODC       EQU     1BH             ;A to D address latch
LTIMER      EQU     1CH             ;lower 8 bits time
            PUSH    D               ;clear subtotal
AVETOP      MOV     E,M             ;put value in C
            XTHL                    ;put subtotal in HL
            DAD     D               ;add BC to HL
            XTHL                    ;put subtotal in stack
            INX     H               ;increment address
            DCR     A
            JNZ     AVETOP          ;do it again for each element
            POP     H               ;HL = subtotal
            PUSH    H               ;stack = subtotal
            DAD     H
            SUB     B
            SUB     B
            MOV     C,A             ;BC = -(2*divisor)
            MOV     E,B
            MVI     B,0FFh          ;DE = (round off value)
            CALL    DIVSUB          ;A = average
            POP     D               ;DE = subtotal
            POP     B               ;B = counter
            POP     H               ;HL = pointer
            RET ;
;*****************************************************
;*      PRINT STRING ROUTINE                         *
;*      prints block starting at HL until            *
;*      it encounters a 00H byte                     *
;*****************************************************
PrnStr      SUB     A               ;init A
PrnStr1     CMP     M
            RZ                      ;****EXIT HERE****
            PUSH    D
            MOV     E,M
            INX     H
            CALL    PRNCHR
            POP     D
            JMP     PrnStr1
;
;*****************************************************
;*      PRINTER DRIVER                               *
;*****************************************************
PRNCHR      PUSH    A
PRNCHL      IN      CSR
```

```
            ANI     0000$0010B
            JNZ     PRNCHL
SLOWDN      DCR     A               ;cycles 256 times
            JNZ     SLOWDN
            MOV     A,E
            OUT     LPOUT
            POP     A
            RET
;
;
            RAM     ORG     1800H
;*** coiler control variables ***
            PUSH    B
ADD120      MOV     A,M
            ADI     128
            MOV     M,A
            INX     H
            DCR     B
            JNZ     ADD120
            POP     B
            POP     H
            RET
;*********************************************
;*      SORT ROUTINE                         *
;*      HL contains starting location        *
;*      and B contains # of elements         *
;*      works on raw data (0-255)            *
;*      destroys all registers except HL & BE*
;*********************************************
SortTab     PUSH    B
            DCR     B
            MOV     C,B
BUBS1       PUSH    H
            POP     D               ;DE contain current address
            PUSH    D
            INX     H               ;HL contain next value
BUBS2       PUSH    B               ;save counters
            LDAX    D               ;load this
            CMP     M               ;cmp to next
            JNC     BUBS3           ;skip swap if this>=next
swap        MOV     B,M             ;put next in B
            MOV     M,A             ;put this in @HL
            MOV     A,B             ;
            STAX    D               ;store this in @DE
BUBS3       POP     B
            INX     D
            INX     H
            DCR     B
            JNZ     BUBS2           ;if pass not done
            POP     H               ;restore table start address
            DCR     C
            MOV     B,C             ;restore counter
            JNZ     BUBS1           ;if # of passes not done
            POP     B
            RET
;
;*********************************************
;*      AVERAGE ROUTINE                      *
;*      calculates the average               *
;*      of a table of values                 *
```

```
;*      assumes raw data (0-255)             *
;*      saves counter and starting address   *
;*********************************************
Average PUSH H           ;save starting address
        PUSH B           ;save counter
        MOV  A,B
        LXI  D,0
```

APPENDIX "B"
DO-GOOD GAGE
by John Moyer
and Jeff Duguid
© 1984
Moyer Manufacturing Company, Inc.

TABLE OF CONTENTS

| | | |
|---|---|---|
| I | SCOPE AND INTRODUCTION | 3 |
| II | WHAT IS "SPC" | 4 |
| III | SPC REQUIREMENTS | 4 |
| | A. Normal Distribution | |
| | B. Under Control | |
| | C. Capability | |
| IV | MACHINE CAPABILITY (what is a machine capability study) | 6 |
| V | PROCESS CONTROL (what is process control) | 7 |
| VI | THE DO-GOOD RETROFIT GAGE | 8 |
| | A. SPC | |
| | B. Machine Capability | |
| | C. Normal Distribution | |
| | D. Process Control | |
| VII | COMPUTER AID | 10 |
| | A. Separate Function | |
| | B. Tied Into Gage | |
| VIII | SETUP OF DO-GOOD RETROFIT GAGE | 11 |
| IX | INTERPRETING DATA FROM THE DO-GOOD GAGE | |

SCOPE AND INTRODUCTION

This manual is intended to briefly explain the concept of statistical process control (SPC), why the Do-Good gage was developed, and how to use the Do-Good gage. It is *not* intended to be a complete SPC program. Prior to implementing such a program, it is recommended that a good book on the subject be studied, such as Charbonneau and Webster's *Industrial Quality Control* (Prentice Hall), and a training program be instituted for operators who will be using SPC.

The Do-Good retrofit gage is the next generation in spring gaging as it provides the following features for the operator:

1. provides a means of comparing measured spring free lengths with meter readings to verify accuracy (meter reads in 0.001" intervals).
2. reduces adverse effects due to temperature drift and electrical noise.
3. provides verification by printout that sort points are properly set and that the probe is the proper distance from the spring.
4. provides a statistical pitch adjustment based on the spring free length as well as past performance. This reduces scrap and helps the coiler run a more normal distribution. (A normal distribution is a must because many statistical methods assume normal distributions).
5. prints out all data necessary for control charting, doing machine capability studies, and determining normality.

WHAT IS STATISTICAL PROCESS CONTROL

Statistics are tools used to make predictions about the quality level of a large group of parts when data is collected from a smaller sample. Consequently, Statistical Process Control is applying statistical measurements (mean, standard deviation, range, etc) to a process to ensure a predictable quality level.

STATISTICAL PROCESS CONTROL REQUIREMENTS

Normal distribution

A normal distribution is represented by a bell shaped curve which has relatively few points or measures at the ends and an increasing number up to a maximum at the middle. If a line is drawn through the high point of the curve to the base line, the two parts formed will be similar in shape and very nearly equal in area. The normal distribution occures often in nature and is used a lot in industrial statistics.

Standard deviation, the scatter or spread of separate measures around the middle, is a statistics tool that can be applied to a normal curve. If one standard deviation is measured off ± from the 0 point under the curve, 68.26% of a random sample should fall within this area. If 100 springs were taken from a barrel of springs and measured for free length, one could expect that 68 of the springs would have free lengths that would be within ± 1 standard deviation from the mean. As manufacturers, we have to be sure that we have more than 68 out of 100 parts within specifications. If one standard deviation is multiplied by 3 and plotted under the curve on the base line ± from the middle point, we would be marking off 3 standard deviations or ± 3 sigma. Mathematically, 99.73% of a random sample should fall within this area if one has a normal distribution. If 100 springs were taken from a barrel and measured for free length, 99-100 of them should measure within 3-sigma of the mean length.

Consequently, in doing machine capability studies, it is preferable to have normal distributions in order that commonly used calculations and charting techniques can be used to determin control, capability, and predict production run quality limits.

Under Control

To determine if a process is under control, one has to use statistical tools such as a mean, (x-bar), range, etc. to determine if the process or machine is producing parts that are within the 3 sigma as established by machine capability study.

Capability

For the machine or process to be considered capable, the average of the parts run ± 3 sigma must be within the print specification limits.

Note: some coustomers require that a quality level be established from the machine capability study. This is generally a ratio between machine capability 6 sigma and total print tolerance.

Machine Capability Study

A machine capability study is a short term study using statistical tools to determine if a machine is runnng parts which have a normal distribution, are in control and are capable of meeting the print requirements. When a machine capability study is done, the data, i.e. free length variation, are collected in subgroups (typically five consecutive parts per subgroup) with at least 10 subgroups spaced throughout a short production run. The data collected are then analyzed using x-bar and R or other appropriate charts. See Exhibit #1 for sample x-bar and R chart.

Process Control

The basic difference between a machine capability study and a process capability study is time. Process capability is determined by using the control charts developed from the machine capability study. See Exhibit 1 (Note: figures used were taken from Do-Good Gage to provide continuity in this manual)

During the production run, samples are taken at intervals as specified by your quality control department. The average of a five-piece sample and the range of the five-piece sample are plotted versus the control limits obtained in the machine capability study to determine if the process is remaining in control. Upper and lower control limits are derived from the statistics obtained in the machine capability study. Our sample x-bar and range charts use the average range to calculate the upper and lower control limits, this is probably the most common but certainly not the only accepted method.

Note: most common machine capability study forms assume you are wording with normal distributions; consequently, if such forms are used to determin control limits, other tests (probablility paper plotting, chi square test, Geary's test, ect) may be needed to determine if normality is a reasonable assumption.

DO-GOOD RETROFIT GAGE

Statistical Process Control

A standard Lion Gage has been re-designed with circuitry to measure lengths ± from the mean free length of the springs as they are being coiled. The gage prints two types of print outs, a machine capability study and a process control study. See Exhibit #2.

When the machine capability study button (MCS 1 min or MCS 15 sec) is pushed, the variation from the mean free length of 20 five piece samples or 100 springs is printed. From this data the following stats are provided (rounded off to the nearest 0.0002"); average x-bar, R-bar, UCLR, 3 sigma, UCLx, LCLx and X and Y factors for finding 3 sigma from the sum of the squares and for finding Z from a chart provided. See Exhibit 5. In addition, a print out of the frequency distribution for the 100 springs sampled is provided.

Test of Normality

See Exhibit 5

'Y' on the print out is 426. Look on the table in exhibit 5 for a 'Y' value close to 426. In this case the number off the chart is 425. In the next column is the 3 sigma calculated from the sum of the squares from the entire population sampled or 3 sigma is 3.49. Next compare the 'X' factor or 1864 to the figures in the next two columns or 1864 is between 1946 and 1763. Since 1864 is within these two limits, there is a better than 50% probability that the distribution is normal. This probability is generally accepted by the auto industry.

Process Control

Control is probably not the best word to use here as Statistics do not control. People use the data to assist in controlling an operation. If the machine capability study shows a non-normal distribution, an out-of-control condition, or lack of capability, further investigation needs to be made in terms of wire quality, tooling, set-up, etc. to locate a specific cause. After corrective action, another machine capability study needs to be made for analysis.

The control limits as developed during the machine capability study are then entered on a standard x-bar and R chart for continued sampling throughout the production run (See Exhibit 3). The operator now pushes the 'stat' button at intervals specified by your Q.C. department. A print out will be produced listing the relative lengths, x-bar, and range for the last five springs ran and, on the next line, relative lengths, x-bar, and range for the last five good springs. Under the x-bar and range lines is a listing of the last 10 springs ran in order last to first, then under that a listing of the last 10 springs ran from their longest value to their shortest (See Exhibit 4). The necessary data is then placed on the X bar and R chart.

If an out-of-control condition occures, it should be noted and comment should be made as to corrective action, etc. based on the cause of the out-of control condition. Another sample should be taken to show control after a corrective action.

COMPUTER AID

A computer program has been developed to process capability studies for the purpose of making graphs and storing data on discs (See Exhibits 6 and 7). In addition, a networking system is under development for the purpose of obtaining the data directly from the gages. This eliminates the need to hand make x-bar and R charts and reduces the posibility making data entery or hand calculation errors.

SET-UP OF DO-GOOD RETROFIT GAGE

1. Plug printer into the gage with the cable provided.
2. Plug gage and printer into a 110 volt power line, preferably with an independent ground line.
3. The printer should be showing two green lights on its front panel. If not, refer to the printer manual. In most cases, if a red light comes on, it is usually due to a loose cover or paper outage. The gage need not have a printer to function.
4. Place the set-up and operate switch in the set-up position. Position the controller switch in the M, (Medium Position) to start. An adjustment later on may be necessary depending upon the scrap rate and machine cabability studies.
5. Position the probe as is normally done.
6. Adjust the "zero" control. On an initial set-up, all four lights will be out when properly set-up. Since this is a sensitive adjustment, it may not be possible to get the bottom two lights (Cal) to go completely out.

If this is the case, get the bottom two lights to flicker equally.

7. When performing the set-up, there are two obvious differences between the Do-Good Gage and the standard Lion Gage. First, it is a push button set-up, and second, there is no controller set-point as this function is performed by the gage. Adjust the probe in 0.010" (or other value as special applications may require) from the mean reading and press the 'Cal +10' button. For accurate statistics, the needle on the meter should read close to +0.010" (on the line at +10 of the meter) when 'Cal +10' is pressed. If meter reads much less than 0.010" move the probe in reset the gage by turning it off for a few seconds, and then re-zero as specified in paragraph six. If the meter reads much more than 0.010" move the prove out. The gage must be reset by turning it off for a few seconds, and then re-zero as specified in paragraph six. Adjust the probe for the sort over setting and press the sort button. Repeat the process for the 'sort under' and 'Cal −10' except press the appropriate buttons for these probe settings and do not check the meter reading before pressing the 'Cal −10' button. Move the probe back to zero and proceed to paragraph eight.

7A. If the free length variation exceeds ±0.025", the gage must be setup using larger calibration points than ±0.010" otherwise the statistics will not be accurate when free lengths peg the meter. To set-up the gage using a calibration other than ±0.010" do the same as in paragraph seven except move the probe in and out 0.020" rather than 0.010". You still want the meter to read about +0.010" when pressing the 'Cal +10' button as before but you must remember this now represents 0.020". The data gathered in this manner must be extrapolated as it is not printed out in its true values. If for example you calibrate the gage at ±0.020" you would need to double all of your results, that is if the gage said 3 sig=9.8 it would in fact be 19.6. The table for checking normality still works, so use the X and Y values as they are but double the 3 sig result. When using ±0.020" calibration it should be understood by the user that the data gathered using ±0.020" calibration will not be as accurate as when using ±0.010" calibration.

8. Move the set-up and operate switch to the manual position. If a printer is attached, it will print out the lengths which were set for the sort and calibrations points. See Exhibit 2. Note: The accuracy of sorting is independent of calibration accuracy. The springs will be sorted as set by the probe at the time the sort buttons were pressed. Also, the sorting portion of the program in the gage sorts the value you set-up. This may seem obvious, but while observing operators I discovered that they would from time to time put sorted springs back into the good because "It was right on the line." With this gage "Right on the line" is "Gone!" If you used other than ±0.010" for calibration the print out will still show ±0.010" and sort lengths will have to be extrapolated to be checked. For example, if you calibrated the gage at ±0.020" and set the sorts at ±0.010" the print out would show sorts at about ±0.005" and calibration at ±0.010".

9. Check free length of spring used to set up gage and adjust probe for the difference between actual free length and specification for mean free length. This will give you a close starting point.

10. Start Coiler with set-up and operate switch in manual position. Adjust the amount of pitch correction (Min/Max Correction knob) until the gage appears to be adjusting correctly.

11. Check the free length of a spring coiled when no lights on the bottom (Cal) flashed and when the needle reads 0. If the spring is one the mean free length, no adjustment needs to be made to the probe. If the spring is not on the mean free length, adjust the probe in or out as required.

12. When the set-up and operate switch is in the manual position, the amount of pitch adjustment is determined by the free length variation of the parts being run, based on the controler switch position, and the max-min pitch adjustment control. After tooling has warmed up and the coiler has stabilized, move the set-up and operate switch to the automatic position (marked A). When this is done the max-min pitch pot adjustment is replaced internally by an adjustment constant which is updated whenever a pitch correction does not achive its intended results. Our testing has shown better results in obtaining a normal distribution when the gage is in the automatic mode. However there are cases such as wire with a poor cast or inconsistent (yet good) wire when the manual mode works better than the automatic.

13. The speed control adjustment has been changed. It is now more correctly called sort time. If you need more time for the air to blow or the chute to stay open, turn the knob clockwise. Otherwise, turn the knob counterclockwise for less time.

14. With the machine running, run a machine capability study to determine if the process is normal, in control, and capable. If it is not, change the controller switch to another setting such as slow or fast, based on whether it appears that the controller is adjusting too much or too little. Normally, the least amount of adjustment capable of centering the process and reacting to trends is the best. If a range is out, try reducing the correction or going to a slower switch position. If an X-Bar is out, try going to more correction or going to a faster switch position. Run another machine capability study. If there is still a problem with having a normal distribution or having an out-of-control situation etc., try different controller settings with the set-up and operate switch in the manual mode. If a problem still exists, check for other causes such as machine problems, set-up problems, wire quality, etc. We have found in tests at out plant that if an X-bar is out-of-control, more pitch correction should be used (or a faster setting). If a range exceeds the upper limit, less pitch correction should be used (or a slower setting). In many cases the occurence of an out of control range indicates a special cause is at work.

The setting of the controller switch and operation mode is listed out on the printouts as A (automatic) or M (medium) controller speed. The number following this represents the pitch correction pot setting in manual and the internal pitch correction value in automatic.

INTERPRETING DATA FROM THE DO-GOOD GAGE

After finishing a Capability Study, first compare the UCLr value with the R= values along the right column of the print out. If any values exceed the UCLr or if several values are at or near UCLr, then it is probable some correction is needed. This may involve checking tooling, setup, or wire for some specific cause effect relationship, or it may require positioning the 'controller' switch in a slower mode.

If the ranges were all "in control", proceed to the next step. Otherwise redo the Capability Study after corrective action has been taken.

Next compare each Xbar= values to both UCLx and LCLx. If they exceed these limits, then it is probable some correction is needed. This may, as before, involve checking tooling, setup, or wire for some specific cause-/effect relationship, or it may require positioning the 'controller' switch in a faster mode. Plotting the values on graph paper to discover trends may help in determining causes. It may also be useful to run a study with the controller disconnected to determine how well a job runs on its own (i.e. diagnosing a worn coiling point or loos pitch stop).

Next, use the 'Y' and 'X' values on the bottom of the print out and the look-up tables to determine if the process is following a noraml distribution. If this test is passed and the frequency distribution graph on the printout is an approximate bell-shaped curve, it can be assumed the process is normal and in control. It is capable if the process + and −3 sigma fall within the blue print limits of your customer. Note: some customers are soon going to require statistical tolerances as well as blue print limits be maintained. It is also rumored 4 sigma may soon be required by some customers.

We have all run into jobs where tolerances were unrealistic if not impossible to meet. If you cannot meet the requirements, then remember you are 100% sorting to the coiler and you can assure your customer that the parts are good.

The process control print out is used to show continued production of good parts. It also provides valuable data for other types of statistical evaluation.

In addition, holding down the series button while coiling springs produces a series printout of the free lengths of springs as they are coiled. There are 10 values to the line to allow the user to keep good count. This is very useful (as is a Capability Study) in trouble shooting machinery and comparing one process to another. We have, for example, used this feature to compare powered wire dereelers to each other as well as to unpowered wire dereelers. We collected a series of 100 values and plotted each value in the order it was coiled. The graph showed a cyclic trend that matched the rotational speed of a (non-Moyer) powered dereeler being used. Replacing this Dereeler with a Moyer Powered Dereeler eliminated these trends and made this job run. Using these capabilities you can put what you know to be your best foot forward on truly tough jobs.

3 Sigma and "X" limit Chart

| Y | Z 3-sig | 1.96 Xmax | -1.96 Xmin | Y | Z 3-sig | 1.96 Xmax | -1.96 Xmin | Y | Z 3-sig | 1.96 Xmax | -1.96 Xmin |
|---|---|---|---|---|---|---|---|---|---|---|---|
| 8000 | 15.14 | 8443 | 7606 | 6112 | 13.23 | 7380 | 6648 | 4662 | 11.56 | 6445 | 5806 |
| 7960 | 15.10 | 8422 | 7587 | 6081 | 13.20 | 7361 | 6631 | 4638 | 11.53 | 6429 | 5791 |
| 7920 | 15.07 | 8401 | 7567 | 6050 | 13.17 | 7342 | 6614 | 4614 | 11.50 | 6412 | 5776 |
| 7880 | 15.03 | 8379 | 7548 | 6019 | 13.13 | 7323 | 6597 | 4590 | 11.47 | 6395 | 5761 |
| 7840 | 14.99 | 8358 | 7529 | 5988 | 13.10 | 7304 | 6580 | 4567 | 11.44 | 6379 | 5747 |
| 7800 | 14.95 | 8337 | 7510 | 5958 | 13.07 | 7286 | 6564 | 4544 | 11.41 | 6363 | 5732 |
| 7761 | 14.91 | 8316 | 7491 | 5928 | 13.03 | 7268 | 6547 | 4521 | 11.38 | 6347 | 5717 |
| 7722 | 14.88 | 8295 | 7472 | 5898 | 13.00 | 7249 | 6530 | 4498 | 11.35 | 6331 | 5703 |
| 7683 | 14.84 | 8274 | 7453 | 5868 | 12.97 | 7231 | 6514 | 4475 | 11.32 | 6315 | 5688 |
| 7644 | 14.80 | 8253 | 7434 | 5838 | 12.93 | 7212 | 6497 | 4452 | 11.30 | 6298 | 5674 |
| 7605 | 14.76 | 8232 | 7415 | 5808 | 12.90 | 7194 | 6480 | 4429 | 11.27 | 6282 | 5659 |
| 7566 | 14.73 | 8211 | 7396 | 5778 | 12.87 | 7175 | 6464 | 4406 | 11.24 | 6266 | 5644 |
| 7528 | 14.69 | 8190 | 7378 | 5749 | 12.84 | 7157 | 6447 | 4383 | 11.21 | 6249 | 5630 |
| 7490 | 14.65 | 8169 | 7359 | 5720 | 12.80 | 7139 | 6431 | 4361 | 11.18 | 6234 | 5615 |
| 7452 | 14.61 | 8149 | 7340 | 5691 | 12.77 | 7121 | 6415 | 4339 | 11.15 | 6218 | 5601 |
| 7414 | 14.58 | 8128 | 7322 | 5662 | 12.74 | 7103 | 6398 | 4317 | 11.12 | 6202 | 5587 |
| 7376 | 14.54 | 8107 | 7303 | 5633 | 12.71 | 7085 | 6382 | 4295 | 11.09 | 6186 | 5573 |
| 7339 | 14.50 | 8087 | 7285 | 5604 | 12.67 | 7066 | 6366 | 4273 | 11.07 | 6170 | 5558 |
| 7302 | 14.47 | 8066 | 7266 | 5575 | 12.64 | 7048 | 6349 | 4251 | 11.04 | 6155 | 5544 |
| 7265 | 14.43 | 8046 | 7248 | 5547 | 12.61 | 7030 | 6333 | 4229 | 11.01 | 6139 | 5530 |
| 7228 | 14.39 | 8025 | 7229 | 5519 | 12.58 | 7013 | 6317 | 4207 | 10.98 | 6123 | 5515 |
| 7191 | 14.36 | 8005 | 7211 | 5491 | 12.54 | 6995 | 6301 | 4185 | 10.95 | 6107 | 5501 |
| 7155 | 14.32 | 7985 | 7193 | 5463 | 12.51 | 6977 | 6285 | 4164 | 10.92 | 6091 | 5487 |
| 7119 | 14.28 | 7964 | 7175 | 5435 | 12.48 | 6959 | 6269 | 4143 | 10.90 | 6076 | 5473 |
| 7083 | 14.25 | 7944 | 7156 | 5407 | 12.45 | 6941 | 6253 | 4122 | 10.87 | 6060 | 5459 |
| 7047 | 14.21 | 7924 | 7138 | 5379 | 12.42 | 6923 | 6236 | 4101 | 10.84 | 6045 | 5445 |
| 7011 | 14.17 | 7904 | 7120 | 5352 | 12.38 | 6906 | 6221 | 4080 | 10.81 | 6029 | 5431 |
| 6975 | 14.14 | 7884 | 7102 | 5325 | 12.35 | 6888 | 6205 | 4059 | 10.79 | 6014 | 5417 |
| 6940 | 14.10 | 7864 | 7084 | 5298 | 12.32 | 6871 | 6189 | 4038 | 10.76 | 5998 | 5403 |
| 6905 | 14.07 | 7844 | 7066 | 5271 | 12.29 | 6853 | 6174 | 4017 | 10.73 | 5983 | 5389 |
| 6870 | 14.03 | 7824 | 7048 | 5244 | 12.26 | 6836 | 6158 | 3996 | 10.70 | 5967 | 5375 |
| 6835 | 14.00 | 7804 | 7030 | 5217 | 12.23 | 6818 | 6142 | 3976 | 10.67 | 5952 | 5362 |
| 6800 | 13.96 | 7784 | 7012 | 5190 | 12.20 | 6800 | 6126 | 3956 | 10.65 | 5937 | 5348 |
| 6766 | 13.92 | 7765 | 6994 | 5164 | 12.17 | 6783 | 6111 | 3936 | 10.62 | 5922 | 5335 |
| 6732 | 13.89 | 7745 | 6977 | 5138 | 12.13 | 6766 | 6095 | 3916 | 10.59 | 5907 | 5321 |

| Y | 3-sig | Xmax | Xmin | Y | 3-sig | Xmax | Xmin | Y | 3-sig | Xmax | Xmin |
|---|---|---|---|---|---|---|---|---|---|---|---|
| 6698 | 13.85 | 7725 | 6959 | 5112 | 12.10 | 6749 | 6080 | 3896 | 10.57 | 5892 | 5308 |
| 6664 | 13.82 | 7706 | 6942 | 5086 | 12.07 | 6732 | 6064 | 3876 | 10.54 | 5877 | 5294 |
| 6630 | 13.78 | 7686 | 6924 | 5060 | 12.04 | 6715 | 6049 | 3856 | 10.51 | 5862 | 5280 |
| 6596 | 13.75 | 7666 | 6906 | 5034 | 12.01 | 6697 | 6033 | 3836 | 10.48 | 5846 | 5267 |
| 6563 | 13.71 | 7647 | 6889 | 5008 | 11.98 | 6680 | 6018 | 3816 | 10.46 | 5831 | 5253 |
| 6530 | 13.68 | 7628 | 6871 | 4982 | 11.95 | 6663 | 6002 | 3796 | 10.43 | 5816 | 5239 |
| 6497 | 13.65 | 7609 | 6854 | 4957 | 11.92 | 6646 | 5987 | 3777 | 10.40 | 5801 | 5226 |
| 6464 | 13.61 | 7589 | 6837 | 4932 | 11.89 | 6629 | 5972 | 3758 | 10.38 | 5787 | 5213 |
| 6431 | 13.58 | 7570 | 6819 | 4907 | 11.86 | 6612 | 5957 | 3739 | 10.35 | 5772 | 5200 |
| 6398 | 13.54 | 7550 | 6802 | 4882 | 11.83 | 6595 | 5941 | 3720 | 10.33 | 5757 | 5186 |
| 6366 | 13.51 | 7532 | 6785 | 4857 | 11.80 | 6579 | 5926 | 3701 | 10.30 | 5743 | 5173 |
| 6334 | 13.47 | 7513 | 6767 | 4832 | 11.77 | 6562 | 5911 | 3682 | 10.27 | 5728 | 5160 |
| 6302 | 13.44 | 7494 | 6750 | 4807 | 11.74 | 6545 | 5896 | 3663 | 10.25 | 5713 | 5146 |
| 6270 | 13.40 | 7475 | 6733 | 4782 | 11.71 | 6528 | 5880 | 3644 | 10.22 | 5698 | 5133 |
| 6238 | 13.37 | 7455 | 6716 | 4758 | 11.68 | 6511 | 5865 | 3625 | 10.19 | 5683 | 5120 |
| 6206 | 13.34 | 7436 | 6699 | 4734 | 11.65 | 6495 | 5851 | 3606 | 10.17 | 5668 | 5106 |
| 6174 | 13.30 | 7417 | 6681 | 4710 | 11.62 | 6478 | 5836 | 3587 | 10.14 | 5653 | 5093 |
| 6143 | 13.27 | 7398 | 6665 | 4686 | 11.59 | 6462 | 5821 | 3569 | 10.11 | 5639 | 5080 |
|   | z | 1.96 | -1.96 |   | z | 1.96 | -1.96 |   | z | 1.96 | -1.96 |
| Y | 3-sig | Xmax | Xmin | Y | 3-sig | Xmax | Xmin | Y | 3-sig | Xmax | Xmin |
| 3569 | 10.11 | 5639 | 5080 | 2714 | 8.82 | 4918 | 4430 | 2057 | 7.68 | 4281 | 3857 |
| 3551 | 10.09 | 5625 | 5067 | 2700 | 8.80 | 4905 | 4418 | 2046 | 7.66 | 4270 | 3846 |
| 3533 | 10.06 | 5611 | 5054 | 2686 | 8.77 | 4892 | 4407 | 2035 | 7.64 | 4258 | 3836 |
| 3515 | 10.04 | 5596 | 5041 | 2672 | 8.75 | 4879 | 4395 | 2024 | 7.62 | 4247 | 3826 |
| 3497 | 10.01 | 5582 | 5028 | 2658 | 8.73 | 4867 | 4384 | 2013 | 7.60 | 4235 | 3815 |
| 3479 | 9.99 | 5568 | 5016 | 2644 | 8.70 | 4854 | 4372 | 2002 | 7.57 | 4224 | 3805 |
| 3461 | 9.96 | 5553 | 5003 | 2630 | 8.68 | 4841 | 4361 | 1991 | 7.55 | 4212 | 3794 |
| 3443 | 9.93 | 5539 | 4990 | 2616 | 8.66 | 4828 | 4349 | 1981 | 7.53 | 4201 | 3785 |
| 3425 | 9.91 | 5524 | 4976 | 2602 | 8.64 | 4815 | 4338 | 1971 | 7.52 | 4191 | 3775 |
| 3407 | 9.88 | 5510 | 4963 | 2588 | 8.61 | 4802 | 4326 | 1961 | 7.50 | 4180 | 3766 |
| 3389 | 9.86 | 5495 | 4950 | 2575 | 8.59 | 4790 | 4315 | 1951 | 7.48 | 4169 | 3756 |
| 3372 | 9.83 | 5481 | 4938 | 2562 | 8.57 | 4778 | 4304 | 1941 | 7.46 | 4159 | 3746 |
| 3355 | 9.81 | 5468 | 4925 | 2549 | 8.55 | 4766 | 4293 | 1931 | 7.44 | 4148 | 3737 |
| 3338 | 9.78 | 5454 | 4913 | 2536 | 8.53 | 4754 | 4282 | 1921 | 7.42 | 4137 | 3727 |
| 3321 | 9.76 | 5440 | 4900 | 2523 | 8.50 | 4741 | 4271 | 1911 | 7.40 | 4126 | 3717 |
| 3304 | 9.73 | 5426 | 4888 | 2510 | 8.48 | 4729 | 4260 | 1901 | 7.38 | 4116 | 3707 |
| 3287 | 9.71 | 5412 | 4875 | 2497 | 8.46 | 4717 | 4249 | 1891 | 7.36 | 4105 | 3698 |
| 3270 | 9.68 | 5398 | 4863 | 2484 | 8.44 | 4705 | 4238 | 1881 | 7.34 | 4094 | 3688 |
| 3253 | 9.66 | 5384 | 4850 | 2471 | 8.42 | 4692 | 4227 | 1871 | 7.32 | 4083 | 3678 |
| 3236 | 9.63 | 5370 | 4837 | 2458 | 8.39 | 4680 | 4216 | 1861 | 7.30 | 4072 | 3668 |
| 3219 | 9.60 | 5356 | 4824 | 2445 | 8.37 | 4668 | 4205 | 1851 | 7.28 | 4061 | 3658 |
| 3202 | 9.58 | 5341 | 4812 | 2432 | 8.35 | 4655 | 4193 | 1841 | 7.26 | 4050 | 3649 |
| 3185 | 9.55 | 5327 | 4799 | 2419 | 8.33 | 4643 | 4182 | 1831 | 7.24 | 4039 | 3639 |
| 3169 | 9.53 | 5314 | 4787 | 2406 | 8.30 | 4630 | 4171 | 1821 | 7.22 | 4028 | 3629 |
| 3153 | 9.51 | 5300 | 4775 | 2393 | 8.28 | 4618 | 4160 | 1811 | 7.20 | 4017 | 3619 |
| 3137 | 9.48 | 5287 | 4763 | 2381 | 8.26 | 4606 | 4149 | 1801 | 7.18 | 4006 | 3609 |
| 3121 | 9.46 | 5273 | 4750 | 2369 | 8.24 | 4594 | 4139 | 1791 | 7.16 | 3995 | 3599 |
| 3105 | 9.43 | 5260 | 4738 | 2357 | 8.22 | 4583 | 4128 | 1782 | 7.15 | 3985 | 3590 |
| 3089 | 9.41 | 5246 | 4726 | 2345 | 8.20 | 4571 | 4118 | 1773 | 7.13 | 3975 | 3580 |
| 3073 | 9.38 | 5233 | 4714 | 2333 | 8.18 | 4559 | 4107 | 1764 | 7.11 | 3965 | 3571 |
| 3057 | 9.36 | 5219 | 4702 | 2321 | 8.16 | 4548 | 4097 | 1755 | 7.09 | 3954 | 3562 |
| 3041 | 9.34 | 5205 | 4689 | 2309 | 8.13 | 4536 | 4086 | 1746 | 7.07 | 3944 | 3553 |
| 3025 | 9.31 | 5192 | 4677 | 2297 | 8.11 | 4524 | 4075 | 1737 | 7.06 | 3934 | 3544 |
| 3009 | 9.29 | 5178 | 4664 | 2285 | 8.09 | 4512 | 4065 | 1728 | 7.04 | 3924 | 3535 |
| 2993 | 9.26 | 5164 | 4652 | 2273 | 8.07 | 4500 | 4054 | 1719 | 7.02 | 3914 | 3526 |
| 2978 | 9.24 | 5151 | 4640 | 2261 | 8.05 | 4488 | 4043 | 1710 | 7.00 | 3903 | 3516 |
| 2963 | 9.21 | 5138 | 4629 | 2249 | 8.03 | 4477 | 4033 | 1701 | 6.98 | 3893 | 3507 |
| 2948 | 9.19 | 5125 | 4617 | 2237 | 8.01 | 4465 | 4022 | 1692 | 6.96 | 3883 | 3498 |
| 2933 | 9.17 | 5112 | 4605 | 2225 | 7.99 | 4453 | 4011 | 1683 | 6.94 | 3872 | 3488 |
| 2918 | 9.14 | 5099 | 4593 | 2213 | 7.96 | 4441 | 4000 | 1674 | 6.93 | 3862 | 3479 |
| 2903 | 9.12 | 5086 | 4582 | 2201 | 7.94 | 4429 | 3989 | 1665 | 6.91 | 3852 | 3470 |
| 2888 | 9.10 | 5073 | 4570 | 2189 | 7.92 | 4416 | 3978 | 1656 | 6.89 | 3841 | 3460 |
| 2873 | 9.07 | 5060 | 4558 | 2178 | 7.90 | 4405 | 3968 | 1647 | 6.87 | 3831 | 3451 |
| 2858 | 9.05 | 5046 | 4546 | 2167 | 7.88 | 4394 | 3958 | 1638 | 6.85 | 3820 | 3441 |
| 2843 | 9.03 | 5033 | 4534 | 2156 | 7.86 | 4383 | 3948 | 1629 | 6.83 | 3810 | 3432 |
| 2828 | 9.00 | 5020 | 4522 | 2145 | 7.84 | 4372 | 3938 | 1620 | 6.81 | 3799 | 3423 |
| 2813 | 8.98 | 5006 | 4510 | 2134 | 7.82 | 4361 | 3928 | 1611 | 6.79 | 3789 | 3413 |
| 2798 | 8.95 | 4993 | 4498 | 2123 | 7.80 | 4349 | 3918 | 1602 | 6.78 | 3778 | 3403 |

| Y | 3-sig | Xmax | Xmin | Y | 3-sig | Xmax | Xmin | Y | 3-sig | Xmax | Xmin |
|---|---|---|---|---|---|---|---|---|---|---|---|
| 2784 | 8.93 | 4981 | 4487 | 2112 | 7.78 | 4338 | 3908 | 1593 | 6.76 | 3768 | 3394 |
| 2770 | 8.91 | 4968 | 4475 | 2101 | 7.76 | 4327 | 3898 | 1585 | 6.74 | 3758 | 3385 |
| 2756 | 8.89 | 4956 | 4464 | 2090 | 7.74 | 4315 | 3887 | 1577 | 6.72 | 3749 | 3377 |
| 2742 | 8.86 | 4943 | 4453 | 2079 | 7.72 | 4304 | 3877 | 1569 | 6.71 | 3739 | 3368 |
| 2728 | 8.84 | 4930 | 4441 | 2068 | 7.70 | 4293 | 3867 | 1561 | 6.69 | 3729 | 3360 |

| Y | 3-sig | Xmax | Xmin | Y | 3-sig | Xmax | Xmin | Y | 3-sig | Xmax | Xmin |
|---|---|---|---|---|---|---|---|---|---|---|---|
| 1561 | 6.69 | 3729 | 3360 | 1173 | 5.80 | 3233 | 2912 | 879 | 5.02 | 2799 | 2521 |
| 1553 | 6.67 | 3720 | 3351 | 1167 | 5.78 | 3225 | 2905 | 874 | 5.00 | 2791 | 2514 |
| 1545 | 6.65 | 3710 | 3342 | 1161 | 5.77 | 3216 | 2897 | 869 | 4.99 | 2783 | 2507 |
| 1537 | 6.64 | 3701 | 3334 | 1155 | 5.75 | 3208 | 2890 | 864 | 4.98 | 2775 | 2499 |
| 1529 | 6.62 | 3691 | 3325 | 1149 | 5.74 | 3200 | 2882 | 859 | 4.96 | 2767 | 2492 |
| 1521 | 6.60 | 3681 | 3316 | 1143 | 5.72 | 3191 | 2875 | 854 | 4.95 | 2759 | 2485 |
| 1513 | 6.58 | 3672 | 3308 | 1137 | 5.71 | 3183 | 2867 | 849 | 4.93 | 2750 | 2478 |
| 1505 | 6.57 | 3662 | 3299 | 1131 | 5.69 | 3175 | 2860 | 844 | 4.92 | 2742 | 2470 |
| 1497 | 6.55 | 3652 | 3290 | 1125 | 5.68 | 3166 | 2852 | 839 | 4.90 | 2734 | 2463 |
| 1489 | 6.53 | 3642 | 3281 | 1119 | 5.66 | 3158 | 2844 | 834 | 4.89 | 2726 | 2456 |
| 1481 | 6.51 | 3633 | 3272 | 1113 | 5.65 | 3149 | 2837 | 829 | 4.87 | 2718 | 2448 |
| 1473 | 6.50 | 3623 | 3264 | 1107 | 5.63 | 3141 | 2829 | 824 | 4.86 | 2710 | 2441 |
| 1465 | 6.48 | 3613 | 3255 | 1101 | 5.62 | 3132 | 2822 | 819 | 4.84 | 2701 | 2433 |
| 1457 | 6.46 | 3603 | 3246 | 1095 | 5.60 | 3124 | 2814 | 814 | 4.83 | 2693 | 2426 |
| 1449 | 6.44 | 3593 | 3237 | 1089 | 5.59 | 3115 | 2806 | 809 | 4.82 | 2685 | 2419 |
| 1441 | 6.43 | 3583 | 3228 | 1083 | 5.57 | 3106 | 2798 | 804 | 4.80 | 2677 | 2411 |
| 1433 | 6.41 | 3573 | 3219 | 1077 | 5.56 | 3098 | 2791 | 799 | 4.79 | 2668 | 2404 |
| 1425 | 6.39 | 3563 | 3210 | 1071 | 5.54 | 3089 | 2783 | 795 | 4.77 | 2662 | 2398 |
| 1417 | 6.37 | 3553 | 3201 | 1065 | 5.52 | 3081 | 2775 | 791 | 4.76 | 2655 | 2392 |
| 1409 | 6.35 | 3543 | 3192 | 1059 | 5.51 | 3072 | 2767 | 787 | 4.75 | 2648 | 2385 |
| 1401 | 6.34 | 3533 | 3183 | 1053 | 5.49 | 3063 | 2759 | 783 | 4.74 | 2641 | 2379 |
| 1393 | 6.32 | 3523 | 3174 | 1047 | 5.48 | 3054 | 2751 | 779 | 4.72 | 2635 | 2373 |
| 1386 | 6.30 | 3514 | 3166 | 1041 | 5.46 | 3046 | 2744 | 775 | 4.71 | 2628 | 2367 |
| 1379 | 6.29 | 3505 | 3158 | 1035 | 5.45 | 3037 | 2736 | 771 | 4.70 | 2621 | 2361 |
| 1372 | 6.27 | 3496 | 3150 | 1029 | 5.43 | 3028 | 2728 | 767 | 4.69 | 2614 | 2355 |
| 1365 | 6.25 | 3488 | 3142 | 1023 | 5.41 | 3019 | 2720 | 763 | 4.68 | 2607 | 2349 |
| 1358 | 6.24 | 3479 | 3134 | 1017 | 5.40 | 3010 | 2712 | 759 | 4.66 | 2601 | 2343 |
| 1351 | 6.22 | 3470 | 3125 | 1011 | 5.38 | 3001 | 2704 | 755 | 4.65 | 2594 | 2336 |
| 1344 | 6.21 | 3461 | 3117 | 1005 | 5.37 | 2992 | 2696 | 751 | 4.64 | 2587 | 2330 |
| 1337 | 6.19 | 3452 | 3109 | 999 | 5.35 | 2984 | 2688 | 747 | 4.63 | 2580 | 2324 |
| 1330 | 6.17 | 3443 | 3101 | 994 | 5.34 | 2976 | 2681 | 743 | 4.61 | 2573 | 2318 |
| 1323 | 6.16 | 3433 | 3093 | 989 | 5.32 | 2969 | 2674 | 739 | 4.60 | 2566 | 2312 |
| 1316 | 6.14 | 3424 | 3085 | 984 | 5.31 | 2961 | 2667 | 735 | 4.59 | 2559 | 2305 |
| 1309 | 6.12 | 3415 | 3077 | 979 | 5.30 | 2954 | 2661 | 731 | 4.58 | 2552 | 2299 |
| 1302 | 6.11 | 3406 | 3068 | 974 | 5.28 | 2946 | 2654 | 727 | 4.56 | 2545 | 2293 |
| 1295 | 6.09 | 3397 | 3060 | 969 | 5.27 | 2938 | 2647 | 723 | 4.55 | 2538 | 2286 |
| 1288 | 6.08 | 3388 | 3052 | 964 | 5.26 | 2931 | 2640 | 719 | 4.54 | 2531 | 2280 |
| 1281 | 6.06 | 3378 | 3043 | 959 | 5.24 | 2923 | 2633 | 715 | 4.53 | 2524 | 2274 |
| 1274 | 6.04 | 3369 | 3035 | 954 | 5.23 | 2916 | 2626 | 711 | 4.51 | 2517 | 2267 |
| 1267 | 6.03 | 3360 | 3027 | 949 | 5.22 | 2908 | 2620 | 707 | 4.50 | 2510 | 2261 |
| 1260 | 6.01 | 3351 | 3018 | 944 | 5.20 | 2900 | 2613 | 703 | 4.49 | 2503 | 2255 |
| 1253 | 5.99 | 3341 | 3010 | 939 | 5.19 | 2893 | 2606 | 699 | 4.48 | 2496 | 2248 |
| 1246 | 5.98 | 3332 | 3002 | 934 | 5.17 | 2885 | 2599 | 695 | 4.46 | 2489 | 2242 |
| 1239 | 5.96 | 3323 | 2993 | 929 | 5.16 | 2877 | 2592 | 691 | 4.45 | 2481 | 2235 |
| 1232 | 5.94 | 3313 | 2985 | 924 | 5.15 | 2869 | 2585 | 687 | 4.44 | 2474 | 2229 |
| 1225 | 5.93 | 3304 | 2976 | 919 | 5.13 | 2862 | 2578 | 683 | 4.42 | 2467 | 2222 |
| 1218 | 5.91 | 3294 | 2968 | 914 | 5.12 | 2854 | 2571 | 679 | 4.41 | 2460 | 2216 |
| 1211 | 5.89 | 3285 | 2959 | 909 | 5.10 | 2846 | 2564 | 675 | 4.40 | 2452 | 2209 |
| 1204 | 5.87 | 3275 | 2951 | 904 | 5.09 | 2838 | 2557 | 671 | 4.39 | 2445 | 2203 |
| 1197 | 5.86 | 3266 | 2942 | 899 | 5.08 | 2830 | 2550 | 667 | 4.37 | 2438 | 2196 |
| 1191 | 5.84 | 3258 | 2935 | 894 | 5.06 | 2822 | 2542 | 663 | 4.36 | 2431 | 2190 |
| 1185 | 5.83 | 3249 | 2927 | 889 | 5.05 | 2814 | 2535 | 659 | 4.35 | 2423 | 2183 |
| 1179 | 5.81 | 3241 | 2920 | 884 | 5.03 | 2807 | 2528 | 655 | 4.33 | 2416 | 2176 |

| Y | 3-sig | Xmax | Xmin | Y | 3-sig | Xmax | Xmin | Y | 3-sig | Xmax | Xmin |
|---|---|---|---|---|---|---|---|---|---|---|---|
| 655 | 4.33 | 2416 | 2176 | 482 | 3.72 | 2072 | 1867 | 348 | 3.16 | 1761 | 1586 |
| 651 | 4.32 | 2408 | 2170 | 479 | 3.71 | 2066 | 1861 | 346 | 3.15 | 1756 | 1582 |
| 647 | 4.31 | 2401 | 2163 | 476 | 3.69 | 2059 | 1855 | 344 | 3.14 | 1751 | 1577 |
| 643 | 4.29 | 2394 | 2156 | 473 | 3.68 | 2053 | 1849 | 342 | 3.13 | 1746 | 1573 |
| 639 | 4.28 | 2386 | 2150 | 470 | 3.67 | 2046 | 1843 | 340 | 3.12 | 1741 | 1568 |
| 635 | 4.27 | 2379 | 2143 | 467 | 3.66 | 2040 | 1838 | 338 | 3.11 | 1735 | 1563 |

| 101 | | | | | | | | 102 | | | |
|---|---|---|---|---|---|---|---|---|---|---|---|
| 631 | 4.25 | 2371 | 2136 | 464 | 3.65 | 2033 | 1832 | 336 | 3.10 | 1730 | 1559 |
| 627 | 4.24 | 2364 | 2129 | 461 | 3.63 | 2027 | 1826 | 334 | 3.09 | 1725 | 1554 |
| 623 | 4.23 | 2356 | 2122 | 458 | 3.62 | 2020 | 1820 | 332 | 3.08 | 1720 | 1549 |
| 619 | 4.21 | 2349 | 2116 | 455 | 3.61 | 2014 | 1814 | 330 | 3.08 | 1715 | 1545 |
| 615 | 4.20 | 2341 | 2109 | 452 | 3.60 | 2007 | 1808 | 328 | 3.07 | 1710 | 1540 |
| 611 | 4.18 | 2333 | 2102 | 449 | 3.59 | 2000 | 1802 | 326 | 3.06 | 1704 | 1535 |
| 607 | 4.17 | 2326 | 2095 | 446 | 3.58 | 1993 | 1796 | 324 | 3.05 | 1699 | 1531 |
| 603 | 4.16 | 2318 | 2088 | 443 | 3.56 | 1987 | 1790 | 322 | 3.04 | 1694 | 1526 |
| 599 | 4.14 | 2310 | 2081 | 440 | 3.55 | 1980 | 1784 | 320 | 3.03 | 1689 | 1521 |
| 596 | 4.13 | 2304 | 2076 | 437 | 3.54 | 1973 | 1778 | 318 | 3.02 | 1683 | 1516 |
| 593 | 4.12 | 2299 | 2071 | 434 | 3.53 | 1966 | 1771 | 316 | 3.01 | 1678 | 1512 |
| 590 | 4.11 | 2293 | 2065 | 431 | 3.51 | 1960 | 1765 | 314 | 3.00 | 1673 | 1507 |
| 587 | 4.10 | 2287 | 2060 | 428 | 3.50 | 1953 | 1759 | 312 | 2.99 | 1667 | 1502 |
| 584 | 4.09 | 2281 | 2055 | 425 | 3.49 | 1946 | 1753 | 310 | 2.98 | 1662 | 1497 |
| 581 | 4.08 | 2275 | 2050 | 422 | 3.48 | 1939 | 1747 | 308 | 2.97 | 1657 | 1492 |
| 578 | 4.07 | 2269 | 2044 | 419 | 3.47 | 1932 | 1741 | 306 | 2.96 | 1651 | 1487 |
| 575 | 4.06 | 2264 | 2039 | 416 | 3.45 | 1925 | 1734 | 304 | 2.95 | 1646 | 1483 |
| 572 | 4.05 | 2258 | 2034 | 413 | 3.44 | 1918 | 1728 | 302 | 2.94 | 1640 | 1478 |
| 569 | 4.04 | 2252 | 2028 | 410 | 3.43 | 1911 | 1722 | 300 | 2.93 | 1635 | 1473 |
| 566 | 4.03 | 2246 | 2023 | 407 | 3.42 | 1904 | 1715 | 298 | 2.92 | 1630 | 1468 |
| 563 | 4.02 | 2240 | 2018 | 404 | 3.40 | 1897 | 1709 | 296 | 2.91 | 1624 | 1463 |
| 560 | 4.01 | 2234 | 2012 | 401 | 3.39 | 1890 | 1703 | 294 | 2.90 | 1619 | 1458 |
| 557 | 4.00 | 2228 | 2007 | 398 | 3.38 | 1883 | 1696 | 292 | 2.89 | 1613 | 1453 |
| 554 | 3.98 | 2222 | 2001 | 396 | 3.37 | 1878 | 1692 | 290 | 2.88 | 1607 | 1448 |
| 551 | 3.97 | 2216 | 1996 | 394 | 3.36 | 1874 | 1688 | 288 | 2.87 | 1602 | 1443 |
| 548 | 3.96 | 2210 | 1991 | 392 | 3.35 | 1869 | 1684 | 286 | 2.86 | 1596 | 1438 |
| 545 | 3.95 | 2204 | 1985 | 390 | 3.34 | 1864 | 1679 | 284 | 2.85 | 1591 | 1433 |
| 542 | 3.94 | 2198 | 1980 | 388 | 3.33 | 1859 | 1675 | 282 | 2.84 | 1585 | 1428 |
| 539 | 3.93 | 2192 | 1974 | 386 | 3.33 | 1855 | 1671 | 280 | 2.83 | 1580 | 1423 |
| 536 | 3.92 | 2185 | 1969 | 384 | 3.32 | 1850 | 1666 | 278 | 2.82 | 1574 | 1418 |
| 533 | 3.91 | 2179 | 1963 | 382 | 3.31 | 1845 | 1662 | 276 | 2.81 | 1568 | 1413 |
| 530 | 3.90 | 2173 | 1958 | 380 | 3.30 | 1840 | 1658 | 274 | 2.80 | 1563 | 1408 |
| 527 | 3.89 | 2167 | 1952 | 378 | 3.29 | 1835 | 1653 | 272 | 2.79 | 1557 | 1402 |
| 524 | 3.88 | 2161 | 1947 | 376 | 3.28 | 1830 | 1649 | 270 | 2.78 | 1551 | 1397 |
| 521 | 3.86 | 2155 | 1941 | 374 | 3.27 | 1826 | 1644 | 268 | 2.77 | 1545 | 1392 |
| 518 | 3.85 | 2148 | 1935 | 372 | 3.27 | 1821 | 1640 | 266 | 2.76 | 1540 | 1387 |
| 515 | 3.84 | 2142 | 1930 | 370 | 3.26 | 1816 | 1636 | 264 | 2.75 | 1534 | 1382 |
| 512 | 3.83 | 2136 | 1924 | 368 | 3.25 | 1811 | 1631 | 262 | 2.74 | 1528 | 1376 |
| 509 | 3.82 | 2130 | 1918 | 366 | 3.24 | 1806 | 1627 | 260 | 2.73 | 1522 | 1371 |
| 506 | 3.81 | 2123 | 1913 | 364 | 3.23 | 1801 | 1622 | 258 | 2.72 | 1516 | 1366 |
| 503 | 3.80 | 2117 | 1907 | 362 | 3.22 | 1796 | 1618 | 256 | 2.71 | 1510 | 1361 |
| 500 | 3.79 | 2111 | 1901 | 360 | 3.21 | 1791 | 1613 | 254 | 2.70 | 1504 | 1355 |
| 497 | 3.77 | 2104 | 1896 | 358 | 3.20 | 1786 | 1609 | 252 | 2.69 | 1498 | 1350 |
| 494 | 3.76 | 2098 | 1890 | 356 | 3.19 | 1781 | 1604 | 250 | 2.68 | 1493 | 1344 |
| 491 | 3.75 | 2092 | 1884 | 354 | 3.19 | 1776 | 1600 | 248 | 2.67 | 1487 | 1339 |
| 488 | 3.74 | 2085 | 1878 | 352 | 3.18 | 1771 | 1595 | 246 | 2.66 | 1481 | 1334 |
| 485 | 3.73 | 2079 | 1873 | 350 | 3.17 | 1766 | 1591 | 244 | 2.64 | 1474 | 1328 |

What is claimed is:

1. A method for controlling a process for manufacturing discrete workpieces and for automatically adjusting an apparatus for producing the workpieces with a controlled dimension about a selected centered mean of a distribution of measured controlled dimensions, said apparatus including a system memory, the method comprising the steps of:

determining a mean value;
storing a correction value in the system memory;
selecting a system closure rate:
measuring the controlled dimension of a last workpiece;
calculating an expected dimension for a next workpiece based on the measured controlled dimension of the last workpiece and the selected closure rate;
manufacturing the next workpiece;
measuring the controlled dimension of the next workpiece;
comparing said measured dimension of the next workpiece with the measured dimension of the last workpiece and the expected dimension;
adjusting the correction value stored in the system memory in accordance with said comparison;
calculating an adjustment value proportional to said adjusted stored correction value; and
adjusting said apparatus in accordance with said adjustment value.

2. The method according to claim 1 wherein the step of mesauring the dimension of the current workpiece comprises:

taking a plurality of readings of the controlled dimension;
arranging the reading in ascending or descending order;
discarding a plurality of highest and lowest readings; and
averaging the plurality of retained readings.

3. The method according to claim 1 including the steps of:
reading the dimensions of a plurality of workpieces at discrete intervals during the operation of the apparatus;
storing the values representative of the measured dimensions;
performing a statistical analysis on said values; and
printing said statistical analysis.

4. The method according to claim 1 wherein the adjustment value is proportional to a calculated allowable variation of the statistical distribution of a plurality of previously produced workpieces.

5. The method according to claim 4 wherein said calculated variation is the three sigma value for the statistical distribution.

6. The method according to claim 1 including the step of comparing the polarity of the measured dimension of the current workpiece relative to the selected mean value with the polarity of the measured dimension of the last workpiece relative to the selected mean value, and decrementing said correction value if said polarities are of opposite signs.

7. A method for controlling an apparatus for manufacturing discrete, workpieces, the method comprising:
calculating a first adjustment value for adjusting said apparatus prior to manufacturing a current workpiece, said adjustment value being based on the statistical distribution of the population of a predetermined number of previously produced workpieces and a correction value stored in a memory;
adjusting said apparatus based on said adjustment value;
calculating an expected dimension for a next workpiece to be manufactured, said expected dimension being proportional to the actual dimension of a last produced workpiece and a selected closure rate;
manfuacturing a current workpiece;
measuring the dimension of said current workpiece;
comparing said measured dimension of said current workpiece with said expected value; and
updating said correction value in accordance with said comparison.

8. The method according to claim 7 wherein the step of measuring the dimension of the current workpiece comprises:
taking a plurality of readings of the dimension of the current workpiece;
sorting the readings and arranging the readings in ascending or descending order;
discarding a plurality of the highest and lowest readings; and
averaging the plurality of retained readings.

9. The method of claim 7 including the step of sorting said workpiece in accordance with predetermined tolerance limits.

10. The method of claim 7 including comparing said measured dimension of said current workpiece with the measured dimension of the last workpiece and updating said correction value in accordance with said comparison.

11. The method of claim 7 including the step of selecting the closure rate of adjustment for said apparatus, said closure rate being used for calculating said adjustment value.

12. The method according to claim 7 and including the steps of:
reading the dimension of a plurality of workpieces at discrete intervals during the operation of the apparatus;
storing the values representative of said read dimensions;
performing a statistical analysis of said stored values; and
printing said statistical analysis.

13. The method according to claim 7 wherein said first adjustment value is proportional to the difference between a fixed target mean value and the measured workpiece dimension and wherein said first adjustment value does not exceed a second adjustment value proportional to the difference between the fixed target mean value and selected limits of the statistical distribution of the plurality of previously produced workpieces.

14. The method according to claim 13 wherein the selected limits are the three sigma limits of said statistical distribution.

15. A method for controlling an apparatus for manufacturing discrete workpieces comprising:
selecting a centered mean value;
selecting and storing a correction value;
manufacturing a workpiece;
measuring a controlled dimension of said workpiece;
computing an adjustment value for adjusting said apparatus based on the measured controlled dimension of said workpiece and said stored correction value;
adjusting said apparatus in accordance with said computed adjustment value;
computing an expected value of the next workpiece to be produced based on the last produced workpiece;
manufacturing a current workpiece;
measuring the controlled dimension of said current workpiece;
comparing the sign of the measured dimension of said current workpiece relative to a selected centered mean value of a distribution of measured controlled dimensions with the sign of the dimension of the last produced workpiece relative to said selected mean value;
updating said stored correction factor by decrementing if said compared signs are of opposite polarities;
comparing the absolute expected value with the absolute measured value of the current workpiece;
updating said stored correction factor by incrementing if said absolute measured value is greater than said absolute expected value of said measured value is of the same polarity as said expected value;
calculating an updated adjustment value; and
adjusting said apparatus in accordance with said updated adjustment value.

16. The method according to claim 15 including the steps of selecting tolerance limits and storing said current workpiece based on said tolerance limits.

17. The method of claim 15 wherein the step of measuring said current workpiece comprises:
taking a plurality of readings;
arranging the readings in ascending order;
deleting a plurality of the highest and lowest readings;
averaging the retained readings.

18. The method according to claim 17 wherein said plurality of readings comprises fifteen readings and said plurality of highest and lowest readings each comprise five readings.

19. The method according to claim 15 including the step of selecting a closure rate for computing said adjustment value, said rate being determinative of the number of adjustment increments between said selected mean value and the measured dimension of the last workpiece.

* * * * *